(12) United States Patent
Kumamoto et al.

(10) Patent No.: US 9,531,028 B2
(45) Date of Patent: Dec. 27, 2016

(54) REDOX FLOW BATTERY

(75) Inventors: Takahiro Kumamoto, Osaka (JP); Yongrong Dong, Osaka (JP); Toshio Shigematsu, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 426 days.

(21) Appl. No.: 14/129,190

(22) PCT Filed: Jun. 22, 2012

(86) PCT No.: PCT/JP2012/065980
§ 371 (c)(1),
(2), (4) Date: Dec. 24, 2013

(87) PCT Pub. No.: WO2013/002137
PCT Pub. Date: Jan. 3, 2013

(65) Prior Publication Data
US 2014/0134465 A1   May 15, 2014

(30) Foreign Application Priority Data

Jun. 27, 2011 (JP) .................................. 2011-142219
Jun. 27, 2011 (JP) .................................. 2011-142220
Jun. 27, 2011 (JP) .................................. 2011-142221

(51) Int. Cl.
H01M 8/20    (2006.01)
H01M 8/18    (2006.01)
H01M 8/04    (2016.01)

(52) U.S. Cl.
CPC ......... *H01M 8/188* (2013.01); *H01M 8/04119* (2013.01); *H01M 8/04186* (2013.01); *H01M 8/20* (2013.01); *Y02E 60/528* (2013.01)

(58) Field of Classification Search
CPC .......... H01M 8/20; H01M 8/18; H01M 8/188; H01M 8/0419; H01M 8/04186
(Continued)

(56) References Cited

U.S. PATENT DOCUMENTS

| | | | | |
|---|---|---|---|---|
| 3,996,064 A | * | 12/1976 | Thaller ................. | H01M 8/188 320/128 |
| 2001/0028977 A1 | * | 10/2001 | Kazacos ............. | B60L 11/1879 429/105 |
| 2010/0003545 A1 | * | 1/2010 | Horne ................. | B60L 11/1824 429/471 |

FOREIGN PATENT DOCUMENTS

| | | |
|---|---|---|
| JP | 58176880 A | 10/1983 |
| JP | 676850 A | 3/1994 |

(Continued)

OTHER PUBLICATIONS

European Office Action corresponding to European Patent Application No. 12804832.9-1360 dated Feb. 10, 2015, 6 pages.
(Continued)

*Primary Examiner* — Kenneth Douyette
(74) *Attorney, Agent, or Firm* — Ditthavong & Steiner, P.C.

(57) ABSTRACT

A redox flow battery charged and discharged by supply of a positive electrode electrolyte stored in a positive electrode tank and a negative electrode electrolyte stored in a negative electrode tank to a battery element, in which the positive electrode electrolyte contains a Mn ion as a positive electrode active material, and the positive electrode tank includes a positive electrode charging pipe opening to a position close to a liquid level of the positive electrode electrolyte in the positive electrode tank, and a positive electrode discharging pipe opening to a position close to the bottom of the positive electrode tank. This redox flow battery can include a stirring mechanism for stirring the electrolytes in the tanks, and can include a connection pipe connecting the positive electrode tank to the negative electrode tank.

19 Claims, 12 Drawing Sheets

(58) Field of Classification Search
USPC .......................................... 429/1–11, 47–347
See application file for complete search history.

(56) References Cited

FOREIGN PATENT DOCUMENTS

| | | |
|---|---|---|
| JP | 6260204 A | 9/1994 |
| JP | H09283169 A | 10/1997 |
| JP | 10334938 A | 12/1998 |
| JP | 11204124 A | 7/1999 |
| JP | 2001043884 A | 2/2001 |
| JP | 2004119311 A | 4/2004 |
| JP | 2006147374 A | 6/2006 |
| JP | 2006147375 A | 6/2006 |
| JP | 2009218080 A | 9/2009 |
| JP | 2010170782 A | 8/2010 |
| JP | 2010244972 A | 10/2010 |

OTHER PUBLICATIONS

International Search Report for corresponding Application No. PCT/JP2012/065980, date of mailing Sep. 4, 2012, 4 pages.

* cited by examiner (A)

(B)

(A)

(B)

(A)

(B)

ns to redox flow batteries. More particularly, the present invention relates to a redox flow battery capable of generating a high electromotive force.

BACKGROUND ART

As a way to combat global warming, introduction of new energy such as solar photovoltaic power generation and wind power generation has been promoted in recent years throughout the world. Since outputs of these power generations are affected by the weather, it is predicted that introduction on a large scale will cause problems with operation of power systems such as difficulty in maintaining frequencies and voltages. As a way to solve such problems, installation of large-capacity storage batteries for smoothing output variations, storing surplus power, and load leveling is expected.

A redox flow battery is one of large-capacity storage batteries. A redox flow battery is charged and discharged by supply of a positive electrode electrolyte and a negative electrode electrolyte to a battery element having a membrane interposed between a positive electrode and a negative electrode. An aqueous solution containing a metal ion having a valence which changes by oxidation-reduction is typically used as the electrolytes. Typical redox flow batteries include an iron-chromium-based redox flow battery containing an iron ion for a positive electrode and a chromium ion for a negative electrode, and an all-vanadium redox flow battery containing a vanadium ion for both the positive and negative electrodes (for example, Japanese Patent Laying-Open No. 2001-043884 (Patent Document 1) and Japanese Patent Laying-Open No. 2006-147374 (Patent Document 2)).

CITATION LIST

Patent Document

PTD 1: Japanese Patent Laying-Open No. 2001-043884
PTD 2: Japanese Patent Laying-Open No. 2006-147374

SUMMARY OF INVENTION

Technical Problem

A vanadium-based redox flow battery is currently put in practical use and expected to be continuously used in the future. It cannot be said, however, that the conventional iron-chromium-based redox flow battery and all-vanadium redox flow battery have a sufficiently high electromotive force. In order to meet future worldwide demand, it is desired to develop a new redox flow battery having a higher electromotive force and containing a metal ion used as an active material that can be supplied stably, and preferably can be supplied stably at low cost.

If the electrolytes of both the positive and negative electrodes can be mixed together as in the all-vanadium redox flow battery, the characteristics of the battery can be improved by the mixing.

Therefore, an object of the present invention is to provide a redox flow battery capable of generating a high electromotive force. Another object of the present invention is to provide a redox flow battery in which electrolytes of both the positive and negative electrodes can be mixed together.

Solution to Problem

One possible way to improve an electromotive force is to use a metal ion having a high standard oxidation-reduction potential as an active material. Metal ions $Fe^{2+}/Fe^{3+}$ and $V^{4+}/V^{5+}$ as a positive electrode active material used in a conventional redox flow battery have standard oxidation-reduction potentials of 0.77V and 1.0V, respectively. The present inventors studied a redox flow battery containing, as a metal ion serving as a positive electrode active material (active material ion), manganese (Mn) which is a water-soluble metal ion, has a standard oxidation-reduction potential higher than those of conventional metal ions, is relatively less expensive than vanadium, and is also considered preferable in terms of resource supply. $Mn^{2+}/Mn^{3+}$ has a standard oxidation-reduction potential of 1.51V, and a manganese ion has desirable properties for constituting a redox couple having a higher electromotive force. The present inventors also studied, focusing on titanium (Ti) as a metal ion serving as a negative electrode active material, a redox flow battery containing titanium. $Ti^{3+}/Ti^{4+}$ has a standard oxidation-reduction potential of 0V, and a titanium ion also has desirable properties for constituting a redox couple having a higher electromotive force. Particularly, a manganese-titanium-based redox flow battery containing a manganese ion as a positive electrode active material and a titanium ion as a negative electrode active material can have a high electromotive force of about 1.4V.

A further study by the present inventors found that repeated charge and discharge of a redox flow battery containing a manganese ion in a positive electrode electrolyte and a redox flow battery containing a titanium ion in a negative electrode electrolyte results in a shortened discharge time, or a shortened charge time due to overcharge. This may be because the electrolytes containing the above-described ions vary in specific gravity between a charged state and a discharged state.

In a conventional all-vanadium redox flow battery, there is little difference in specific gravity of an electrolyte between a charged state and a discharged state. The electrolyte in a tank is naturally stirred to have a uniform ion concentration.

It was found that, in a positive electrode electrolyte containing a manganese ion as a positive electrode active material, a charged trivalent manganese ion ($Mn^{3+}$) has a specific gravity greater (heavier) than that of a divalent manganese ion ($Mn^{2+}$). It was thus found that the electrolyte in a charged state (liquid containing a relatively large amount of $Mn^{3+}$) tends to settle to the bottom of a positive electrode tank, and as charge continues, $Mn^{3+}$ in a charged state has an ion concentration higher than that of $Mn^{2+}$ in a non-charged state on the bottom side in the positive electrode tank. In other words, it was found that, during charge, an ion concentration distribution with a large amount of $Mn^{2+}$ in a region close to a liquid level of the positive electrode tank and a large amount of $Mn^{3+}$ in a region close to the bottom of the tank (two-layer state) tends to occur in the positive electrode electrolyte in the tank.

Accordingly, if the electrolyte is to be delivered from the bottom side of the positive electrode tank to a battery element, for example, the electrolyte in a charged state is supplied to the battery element during charge. This results in a shortened period of time during which the battery attains a target voltage at the end of charge, or a shortened period of time during which the battery can be charged due to overcharge, thus decreasing efficiency. In the worst case, an overvoltage may be generated or the deposition of the active material may occur during charge.

In a redox flow battery in which electrolytes can be mixed together by containing a manganese ion as a positive electrode active material and containing a manganese ion also in a negative electrode electrolyte, or by containing a titanium ion as a negative electrode active material and containing a titanium ion also in a positive electrode electrolyte, when mixing the electrolytes of both the positive and negative electrodes via a connection pipe, if an opening of the connection pipe on the positive electrode side is provided on the bottom side of the positive electrode tank, the positive electrode electrolyte containing a relatively large amount of manganese ions in a charged state and the negative electrode electrolyte are mixed together, thus likely increasing a loss by self-discharge.

It was also found that, in a negative electrode electrolyte containing a titanium ion as a negative electrode active material, a charged trivalent titanium ion ($Ti^{3+}$) has a specific gravity smaller (lighter) than that of a tetravalent titanium ion (such as $Ti^{4+}$, $TiO^{2+}$). Thus, contrary to the above-described positive electrode electrolyte containing a manganese ion, during charge, an ion concentration distribution with a large amount of $Ti^{3+}$ in a region close to a liquid level of the negative electrode tank and a large amount of tetravalent titanium ions in a region close to the bottom of the tank tends to occur in the negative electrode electrolyte in the tank.

Accordingly, if the electrolyte is to be delivered from the bottom side of the negative electrode tank to the battery element as described above, for example, the electrolyte not sufficiently charged (liquid containing a relatively large amount of tetravalent titanium ions) is supplied to the battery element during charge. This results in a shortened discharge time, thus decreasing efficiency.

In a redox flow battery in which electrolytes can be mixed together as described above, when mixing the electrolytes of both the positive and negative electrodes via a connection pipe, if an opening of the connection pipe on the negative electrode side is provided on the liquid level side of the negative electrode tank, the negative electrode electrolyte containing a relatively large amount of titanium ions in a charged state and the positive electrode electrolyte are mixed together, thus likely increasing a loss by self-discharge.

The present invention is defined below based on the studies and findings described above.

A redox flow battery according to the present invention is directed to a redox flow battery charged and discharged by supply of a positive electrode electrolyte in a positive electrode tank and a negative electrode electrolyte in a negative electrode tank to a battery element including a positive electrode, a negative electrode, and a membrane interposed between these electrodes.

A first invention is directed to an embodiment where the positive electrode electrolyte contains a manganese ion. This embodiment is characterized by including the following feature (1).

<Feature (1)>

A positive electrode charging pipe for supplying the positive electrode electrolyte to the battery element during charge and a positive electrode discharging pipe for supplying the positive electrode electrolyte to the battery element during discharge are connected to the positive electrode tank. The positive electrode charging pipe has one end opening to a position close to a liquid level of the positive electrode electrolyte in the positive electrode tank. The positive electrode discharging pipe has one end opening to a position close to the bottom of the positive electrode tank.

A second invention is directed to an embodiment where the negative electrode electrolyte contains a titanium ion. This embodiment is characterized by including the following feature (2).

<Feature (2)>

A negative electrode charging pipe for supplying the negative electrode electrolyte to the battery element during charge and a negative electrode discharging pipe for supplying the negative electrode electrolyte to the battery element during discharge are connected to the negative electrode tank. The negative electrode charging pipe has one end opening to a position close to the bottom of the negative electrode tank. The negative electrode discharging pipe has one end opening to a position close to a liquid level of the negative electrode electrolyte in the negative electrode tank.

A third invention is directed to an embodiment where the positive electrode electrolyte contains a manganese ion, and the negative electrode electrolyte contains a titanium ion. This embodiment is characterized by including the above-described features (1) and (2).

A fourth invention is characterized by including the following feature (3).

<Feature (3)>

The redox flow battery includes a stirring mechanism for stirring the positive electrode electrolyte in the positive electrode tank or the negative electrode electrolyte in the negative electrode tank, and control means for controlling operation of the stirring mechanism. In the fourth invention, how the stirring mechanism is provided varies with the compositions of the positive electrode electrolyte and negative electrode electrolyte. Specifically, there are three cases as described below.

[1] If the positive electrode electrolyte contains a manganese ion as a positive electrode active material while the negative electrode electrolyte does not contain a titanium ion, the stirring mechanism is provided on the positive electrode tank storing the positive electrode electrolyte. Of course, the stirring mechanism may also be provided on the negative electrode tank storing the negative electrode electrolyte.

[2] If the negative electrode electrolyte contains a titanium ion as a negative electrode active material while the positive electrode electrolyte does not contain a manganese ion, the stirring mechanism is provided on the negative electrode tank. Of course, the stirring mechanism may also be provided on the positive electrode tank.

[3] If the positive electrode electrolyte contains a manganese ion and the negative electrode electrolyte contains a titanium ion, the stirring mechanism is provided on both of the positive electrode tank and the negative electrode tank.

It is noted that "a position close to a liquid level" as used herein refers to a position higher than (L/2) and lower than (L) from the bottom of a tank, when the distance from the bottom of the tank to the liquid level of an electrolyte in the tank is represented as L. It is noted that "a position close to the bottom" as used herein refers to a position equal to or lower than (L/2) from the bottom of the tank.

In the redox flow battery according to the present invention including at least one of the above-described features (1) and (2), an electrolyte not sufficiently charged (liquid containing a relatively large amount of $Mn^{2+}$ in the positive electrode, liquid containing a relatively large amount of tetravalent titanium ions in the negative electrode) can be supplied to the battery element during charge, while an electrolyte sufficiently charged (liquid containing a relatively large amount of $Mn^{3+}$ in the positive electrode, liquid containing a relatively large amount of $Ti^{3+}$ in the negative electrode) can be supplied to the battery element during discharge. As such, in the redox flow battery according to the present invention, the electrolytes having different specific gravities can be efficiently utilized during the operation of charge and discharge. A fully charged electrolyte can be used during discharge, for example. Therefore, the redox flow battery according to the present invention can have an increased voltage and produce an increased output, thereby having a high electromotive force over a long time.

In the redox flow battery according to the present invention including the above-described feature (3), even when the distribution of the active material ions in the electrolyte in the tank becomes non-uniform due to charge and discharge, the distribution can be quickly uniformed. The timing of the stirring may be prior to delivering the electrolyte to the battery element for charge and discharge, and the stirring is preferably continued at least until after the completion of the delivery of the electrolyte for charge and discharge. As a result, the occurrence of a problem such as undercharge or underdischarge in the redox flow battery containing at least one of a manganese ion and a titanium ion as an active material can be suppressed.

Preferred embodiments of the redox flow battery according to the present invention will be described.

In one embodiment of the present invention including at least one of the above-described features (1) and (2), preferably, each of the charging pipe and the discharging pipe in the same electrode of one of positive and negative electrodes has the other end connected to one end of a single common pipe, to supply the electrolyte of this electrode to the battery element via the common pipe.

In the embodiment where the common pipe is provided, preferably, for example, the charging pipe and the discharging pipe connected to the common pipe are each provided with a pump for transferring the electrolyte by pressure, and the common pipe is provided with a three-way valve at a position where the common pipe is connected to the charging pipe and the discharging pipe.

In the embodiment where the common pipe is provided, preferably, the charging pipe and the discharging pipe connected to the common pipe are each provided with a pump for transferring the electrolyte by pressure and a check valve.

In the embodiment where the common pipe is provided, the number of pipes connected to the battery element can be reduced. In the above-described embodiment, moreover, since the charging pipe and the discharging pipe are each provided with a pump, the electrolyte can be supplied to the battery element under a desired pressure during both charge and discharge. Furthermore, switching of the three-way valve in the embodiment where the three-way valve is provided or the check valve in the embodiment where the check valve is provided can prevent the backflow of the electrolyte to avoid the mixing of the electrolytes having different specific gravities. Additionally, in the embodiment where the three-way valve is provided, the number of components can be reduced and the structure can be simplified. In the embodiment where the check valve is provided, switching operation as is needed for the three-way valve is not required and a defect due to malfunction (such as a failure in the pump) does not occur.

In another embodiment where the common pipe is provided, preferably, the common pipe is provided with a three-way valve at a position where the common pipe is connected to the charging pipe and the discharging pipe, and the common pipe is provided with a pump for transferring the electrolyte by pressure between the three-way valve and the battery element.

In the above-described embodiment, switching of the three-way valve can prevent the backflow of the electrolyte to avoid the mixing of the electrolytes having different specific gravities, as described above. Additionally, in the above-described embodiment where a single three-way valve is provided instead of two check valves, and a single pump is shared between during charge and during discharge, the number of components can be reduced and the structure can be further simplified. Furthermore, the running costs can be reduced owing to the single pump in the above-described embodiment.

In one embodiment of the present invention including at least one of the above-described features (1) and (2), preferably, a positive electrode charging return pipe for returning the positive electrode electrolyte from the battery element to the positive electrode tank during charge and a positive electrode discharging return pipe for returning the positive electrode electrolyte from the battery element to the positive electrode tank during discharge are connected to the positive electrode tank. In this embodiment, preferably, for example, the positive electrode charging return pipe has one end opening to a position close to the bottom of the positive electrode tank, the positive electrode discharging return pipe has one end opening to a position close to a liquid level of the positive electrode electrolyte in the positive electrode tank, each of the positive electrode charging return pipe and the positive electrode discharging return pipe has the other end connected to one end of a single positive electrode common return pipe, and the positive electrode common return pipe is provided with a three-way valve at a position where the positive electrode common return pipe is connected to the positive electrode charging return pipe and the positive electrode discharging return pipe. In this embodiment, the positive electrode electrolyte from the battery element is delivered to the positive electrode charging return pipe and the positive electrode discharging return pipe via the positive electrode common return pipe.

Preferably, a negative electrode charging return pipe for returning the negative electrode electrolyte from the battery element to the negative electrode tank during charge and a negative electrode discharging return pipe for returning the negative electrode electrolyte from the battery element to the negative electrode tank during discharge are connected to the negative electrode tank. In this embodiment, preferably, for example, the negative electrode charging return pipe has one end opening to a position close to a liquid level of the negative electrode electrolyte in the negative electrode tank, the negative electrode discharging return pipe has one end opening to a position close to the bottom of the negative electrode tank, each of the negative electrode charging return pipe and the negative electrode discharging return pipe has the other end connected to one end of a single negative electrode common return pipe, and the negative electrode common return pipe is provided with a three-way valve at a position where the negative electrode common return pipe is connected to the negative electrode charging return pipe and the negative electrode discharging return pipe. In this embodiment, the negative electrode electrolyte from the battery element is delivered to the negative electrode charging return pipe and the negative electrode discharging return pipe via the negative electrode common return pipe.

In the embodiment where the charging return pipe and the discharging return pipe are provided, when returning the electrolyte discharged from the battery element to the tank, for example, the occurrence of mixing of the electrolyte having an increased specific gravity and the electrolyte having a decreased specific gravity after charge with the electrolyte having a different specific gravity in the tank can be suppressed. That is, in the above-described embodiment, a two-layer state (ion concentration distribution) of the electrolyte in a charged state and the electrolyte not sufficiently charged can be readily produced or maintained. In the above-described embodiment, therefore, the electrolyte containing a relatively large amount of ions not sufficiently charged (discharged state) can be efficiently supplied to the battery element during charge, while the electrolyte containing a relatively large amount of ions sufficiently charged can be efficiently supplied to the battery element during discharge.

In one embodiment of the redox flow battery according to the present invention including the above-described feature (3), preferably, the stirring mechanism includes an introduction pipe and a gas supply mechanism.

Preferably, the introduction pipe connects the inside and outside of the tank and opens to the electrolyte stored in the tank.

Preferably, the gas supply mechanism supplies inert gas into the tank via the introduction pipe. This structure allows stirring of the electrolyte by bubbling the electrolyte with the inert gas. For more efficient bubbling, preferably, a plurality of air holes are provided in a portion of a sidewall of the introduction pipe which is arranged within the electrolyte.

In one embodiment of the redox flow battery according to the present invention including the above-described feature (3), preferably, the stirring mechanism includes a stirring member for stirring the electrolyte in the tank by rotating or swinging in the electrolyte. This structure can cause convection in the electrolyte by the movement of the stirring member, to stir the electrolyte in the tank effectively.

In one embodiment of the redox flow battery according to the present invention including the above-described feature (3), preferably, the stirring member is operated by an electromagnetic force. In this case, a permanent magnet coated with resin may be used as the stirring member. This resin-coated magnet may be rotated or vibrated by an electromagnetic force from outside of the tank. This is structured in the same manner as the so-called magnetic stirrer.

For example, if the electrolyte is to be stirred by a stirring member having a propeller at the tip of a rotation shaft, a hole needs to be formed in the tank to pass the rotation shaft through the hole, and the gap between the hole and the rotation shaft needs to be sealed. In contrast, if the stirring member is to be operated by an electromagnetic force, a hole does not need to be formed in the tank, thus not requiring the sealing, either.

In one embodiment of the redox flow battery according to the present invention including the above-described feature (3), preferably, the stirring mechanism includes a stirring pipe and a liquid delivery pump. Preferably, the stirring pipe has one end opening to a liquid phase in the tank, and the other end opening to the liquid phase or a gas phase in the same tank. Preferably, the liquid delivery pump delivers the electrolyte from the side of the one end to the side of the other end of the stirring pipe. This structure can cause strong convection in the electrolyte in the tank, to stir the electrolyte in the tank efficiently and effectively.

In one embodiment of the redox flow battery according to the present invention including the stirring pipe and the liquid delivery pump, preferably, the redox flow battery includes a temperature regulation mechanism for regulating the temperature of the electrolyte provided in a portion of the stirring pipe.

Basically, in the redox flow battery according to the present invention, the stirring mechanism is operated before charge and discharge. By providing the temperature regulation mechanism in a portion of the stirring pipe, therefore, during charge and discharge of the redox flow battery, the temperature of the electrolyte can be efficiently regulated to a temperature suitable for charge and discharge. In addition, unnecessary operation of the temperature regulation mechanism can be eliminated when the stirring mechanism is not operating, thereby reducing the running costs of the redox flow battery.

In one embodiment of the redox flow battery according to the present invention including the stirring pipe and the liquid delivery pump, preferably, the redox flow battery includes a filter for removing impurities and depositions in the electrolyte provided in a portion of the stirring pipe.

By providing the filter on the stirring pipe as described above, the electrolyte can be filtered while being stirred. This eliminates the need for another pump for liquid delivery to the filter, thereby reducing the facility costs and running costs of the redox flow battery.

In one embodiment of the redox flow battery according to the present invention including the above-described feature (3), preferably, the control means causes the stirring mechanism to operate intermittently according to a predetermined schedule.

It is inefficient to operate the stirring mechanism at all times. The intermittent operation of the stirring mechanism can reduce the running costs of the redox flow battery. The stirring mechanism can be operated according to a schedule because a standard redox flow battery often has an operation scheduled predetermined to a certain degree. For example, if a redox flow battery is provided for load leveling, the redox flow battery is often operated according to a predetermined operation schedule where the battery is charged at night and discharged during a period of high demand for electricity in the daytime. If the operation schedule has been determined in this manner, a schedule for stirring the electrolyte can be readily determined in accordance with the operation schedule.

In one embodiment of the redox flow battery according to the present invention including the above-described feature (3), preferably, the redox flow battery includes a detection mechanism for detecting a state of distribution of active material ions in the electrolyte in the tank. In this case, the control means may control the stirring mechanism based on a detection result from the detection mechanism.

By operating the stirring mechanism based on the detection result, namely, by operating the stirring mechanism when the concentration distribution of the active material ions in the electrolyte becomes non-uniform, the running costs of the redox flow battery can be effectively reduced. The detection mechanism may be a detection mechanism for detecting the concentration distribution of the active material ions by detecting the degree of transparency (or chromaticity) of the electrolyte, as illustrated in Embodiment 15 to be described later with reference to FIG. 11(A). The degree of transparency of the electrolyte can be an object of detection because the degree of transparency of both an electrolyte containing a manganese ion and an electrolyte containing a titanium ion varies with the oxidation number of ion. Alternatively, a detection mechanism for detecting the concentration distribution of the active material ions by actually sampling the electrolyte may be employed.

In one embodiment of the redox flow battery according to the present invention including at least one of the above-described features (1) to (3), preferably, the positive electrode electrolyte and the negative electrode electrolyte contain the same metal ion species, and the redox flow battery includes a connection pipe connecting a liquid phase in the positive electrode tank to a liquid phase in the negative electrode tank.

In an embodiment where the same metal ion species is a manganese ion, namely, in an embodiment where a manganese ion is contained as a positive electrode active material and the negative electrode electrolyte also contains a manganese ion, preferably, the connection pipe has one end opening to a position close to a liquid level of the positive electrode electrolyte in the positive electrode tank.

In an embodiment where the same metal ion species is a titanium ion, namely, in an embodiment where a titanium ion is contained as a negative electrode active material and the positive electrode electrolyte also contains a titanium ion, preferably, the connection pipe has one end opening to a position close to the bottom of the negative electrode tank.

In an embodiment where the same metal ion species are a manganese ion and a titanium ion, namely, in an embodiment where a manganese ion is contained as a positive electrode active material, a titanium ion is contained as a negative electrode active material, the positive electrode electrolyte contains a titanium ion, and the negative electrode electrolyte contains a manganese ion, preferably, the connection pipe has one end opening to a position close to a liquid level of the positive electrode electrolyte in the positive electrode tank, and the connection pipe has the other end opening to a position close to the bottom of the negative electrode tank.

In the redox flow battery according to the present invention including the above-described features, when the electrolytes of both the positive and negative electrodes are mixed via the connection pipe, self-discharge can be effectively reduced, or substantially does not occur. In the redox flow battery according to the present invention, therefore, when variation in the amount of electrolytes of both electrodes (occurrence of a difference in liquid level) and variation in ion concentration occur due to liquid migration over time and the like, the variations can be readily corrected by mixing the electrolytes of both electrodes, and a loss by self-discharge during the mixing can be reduced. Furthermore, in the redox flow battery according to the present invention, the occurrence of self-discharge during the mixing can be suppressed by the mixing of the electrolytes in specific regions in the tanks of both electrodes. Thus, the electrolytes in the tanks can be mixed at any time regardless of the charged states of the electrolytes. Then, self-discharge of the redox flow battery can be quickly performed to restore the battery capacity.

Particularly, in the embodiment where the electrolytes of both the positive and negative electrodes contain both a manganese ion and a titanium ion, each of the electrolytes of both electrodes to be mixed together contains a relatively large amount of ions not sufficiently charged (discharged state). In this embodiment, therefore, when the electrolytes of both electrodes are mixed, a loss by self-discharge can be reduced more readily, or self-discharge substantially does not occur. In the above-described embodiment, the titanium ion in the positive electrode electrolyte also has the function of suppressing the deposition of $MnO_2$ by disproportionation reaction of $Mn^{3+}$. The present inventors found that the deposition can be effectively suppressed by containing a manganese ion as well as a titanium ion in the positive electrode electrolyte. Therefore, a high electromotive force can be obtained over a long time in this embodiment.

In the redox flow battery according to the present invention including the connection pipe, preferably, the connection pipe is provided with an on/off valve.

In the above-described embodiment, operation of closing the on/off valve can prevent the connection between the tanks of both the positive and negative electrodes at all times and the mixing of the electrolytes of both electrodes at all times. In the above-described embodiment, therefore, self-discharge by the mixing of the electrolytes of both electrodes can be further reduced, and a loss by the self-discharge can be further reduced.

In the redox flow battery according to the present invention including the connection pipe, preferably, at least a portion of the connection pipe has an inner diameter $\phi$ of not more than 25 mm.

In the above-described embodiment, the tanks of both the positive and negative electrodes are connected together at all times, and thus variation in the amount of electrolytes of both electrodes and variation in ion concentration substantially do not occur. In the above-described embodiment, therefore, the electrolytes of both electrodes can be mixed together without operation of opening/closing the on/off valve. Additionally, in the above-described embodiment, since at least a portion of the connection pipe is narrow, excessive mixing of the electrolytes can be prevented to suppress a loss by the self-discharge.

Advantageous Effects of Invention

The redox flow battery according to the present invention has a high electromotive force. The redox flow battery according to the present invention can generate a high electromotive force and has stable charge and discharge characteristics.

DESCRIPTION OF EMBODIMENTS

Figure 1:
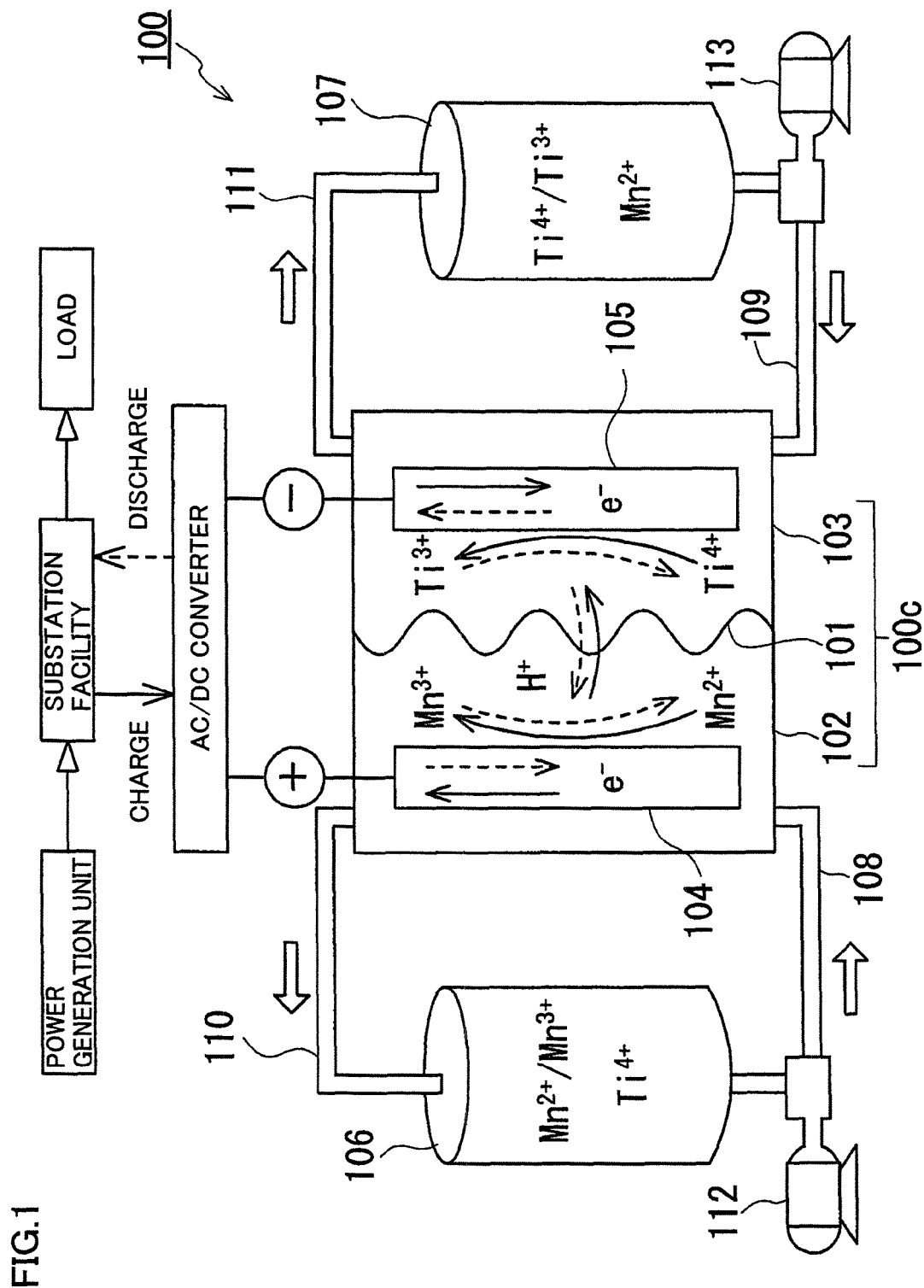
FIG. 1 is a schematic structural diagram of a basic structure of a redox flow battery common to embodiments.

Embodiments of the present invention will be hereinafter described in detail with reference to the drawings, in which the same reference characters denote the same components. Metal ions (species, valence) in the drawings are for illustrative purposes.

Embodiments of a redox flow battery according to the present invention will be described with reference to the drawings. The redox flow batteries in the respective embodiments have structures mostly common to each other, which will be described with reference to FIG. 1. A structure inherent in each embodiment will be subsequently described with reference to the drawings.

<Basic Structure>

FIG. 1 is a schematic structural diagram showing a portion having the structure common to redox flow batteries (hereinafter referred to as RF batteries) 100 in the respective embodiments. RF battery 100 is different from a conventional redox flow battery in that a manganese ion (hereinafter also referred to as a Mn ion) is used as a positive electrode active material and a titanium ion (hereinafter also referred to as a Ti ion) is used as a negative electrode active material. In FIG. 1, solid line arrows indicate charge, and broken line arrows indicate discharge. FIG. 1 illustrates typical active material ions, and ions other than those illustrated may be included. For example, although FIG. 1 shows $Ti^{4+}$ as a tetravalent Ti ion, other ions such as $TiO^{2+}$ may be included.

RF battery 100 in FIG. 1 is typically connected via an AC/DC converter to a power system including a power generation unit (e.g., a solar photovoltaic power generator, a wind power generator, or a common power plant) and a substation facility, and is charged with the power generation unit as a power supply source and discharged to provide power to a load. As with a conventional RF battery, RF battery 100 includes a battery element 100c, and a circulation mechanism (tanks, pipes, pumps) for circulating an electrolyte through battery element 100c.

[Battery Element and Circulation Mechanism]

Battery element 100c provided in RF battery 100 includes a positive electrode cell 102 having a positive electrode 104 therein, a negative electrode cell 103 having a negative electrode 105 therein, and a membrane 101 which separates cells 102 and 103 from each other and through which ions permeate. Positive electrode cell 102 is connected to a positive electrode tank 106 storing a positive electrode electrolyte via pipes 108 and 110. Negative electrode cell 103 is connected to a negative electrode tank 107 storing a negative electrode electrolyte via pipes 109 and 111. Pipes 108 and 109 include pumps 112 and 113 for circulating the electrolytes of both electrodes, respectively. Battery element 100c utilizes pipes 108 to 111 and pumps 112, 113 to supply the positive electrode electrolyte in positive electrode tank 106 and the negative electrode electrolyte in negative electrode tank 107 to positive electrode cell 102 (positive electrode 104) and negative electrode cell 103 (negative electrode 105) through circulation, respectively, to charge and discharge the battery through valence change reaction of the active material ions (the Mn ion in the positive electrode, the Ti ion in the negative electrode) serving as active materials in the electrolytes of both electrodes.

Battery element 100c is usually utilized in a form referred to as a cell stack including a plurality of stacked battery elements. Cells 102 and 103 forming battery element 100c are typically structured with a cell frame, the cell frame including a bipolar plate (not shown) having positive electrode 104 arranged on one surface and negative electrode 105 on the other surface, and a frame body (not shown) having a liquid supply hole for supplying the electrolytes and a liquid drainage hole for draining the electrolytes, and formed on the periphery of the bipolar plate. By stacking a plurality of cell frames, the liquid supply holes and the liquid drainage holes form a fluid path for the electrolytes, which is connected to pipes 108 to 111. The cell stack is structured by successively and repeatedly stacking a cell frame, positive electrode 104, membrane 101, negative electrode 105, a cell frame . . . . Typically, the bipolar plate is made of plastic carbon, and the frame body of the cell frame is made of resin such as vinyl chloride.

Embodiments 1 to 12

Embodiments 1 to 12 are described below. RF batteries in Embodiments 1 to 12 have the above-described basic structure, and are characterized by including at least one of the above-described features (1) and (2).

Embodiment 1

Figure 2:
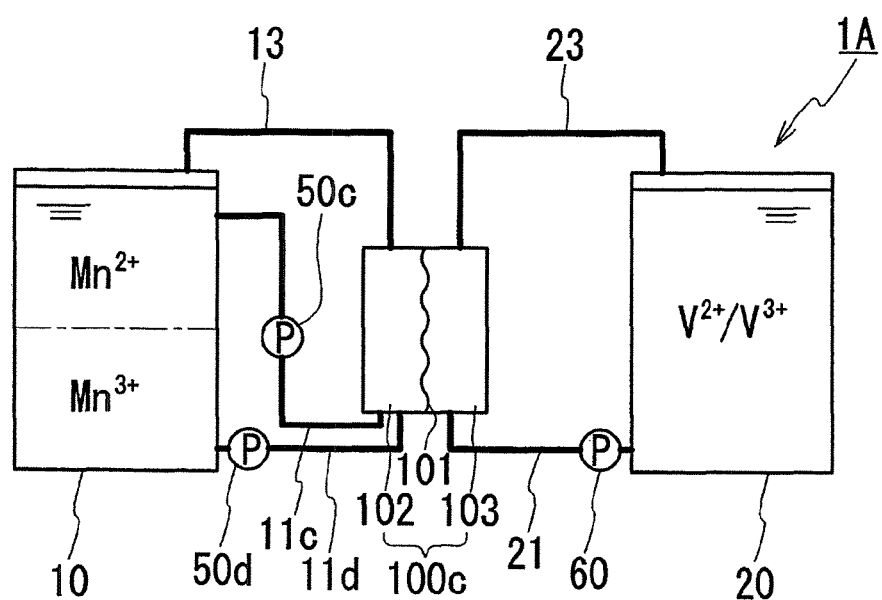
FIG. 2 is a schematic structural diagram of the redox flow battery according to the present invention, with FIG. 2(A) showing Embodiment 1 and FIG. 2(B) showing Embodiment 2.
Figure 2:
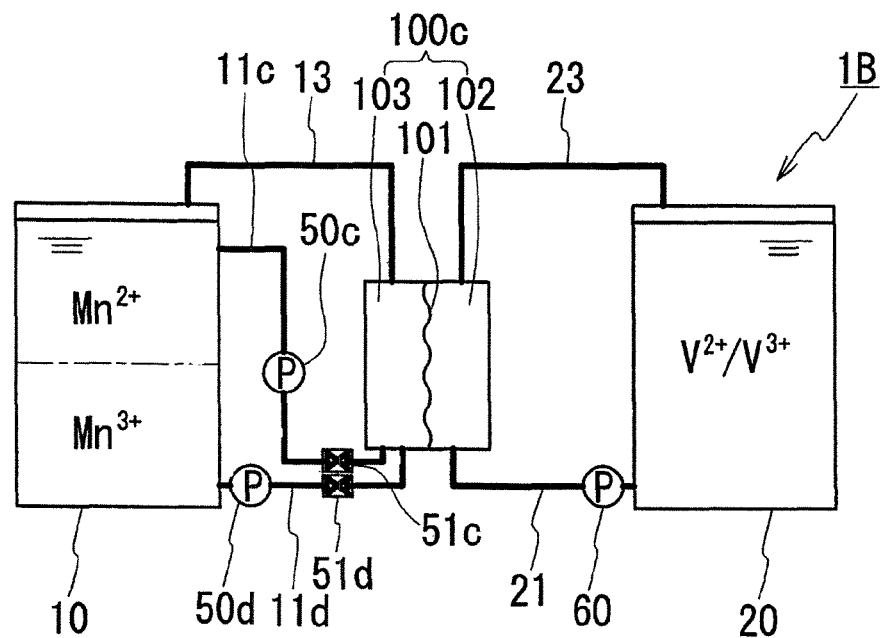

Referring to FIG. 2, an RF battery 1A in Embodiment 1 is described. RF battery 1A in Embodiment 1 has the above-described basic structure, and is characterized by using an electrolyte containing a Mn ion as a positive electrode active material as a positive electrode electrolyte, and by including two upstream pipes on the positive electrode side. These characteristic points will be mainly described below.

[Electrolytes]

The positive electrode electrolyte contains at least one species of Mn ion selected from a divalent Mn ion ($Mn^{2+}$) and a trivalent Mn ion ($Mn^{3+}$). A study by the present inventors found that $MnO_2$ can also be utilized as an active material. Accordingly, the present invention allows inclusion of tetravalent manganese ($MnO_2$).

Figure 3:
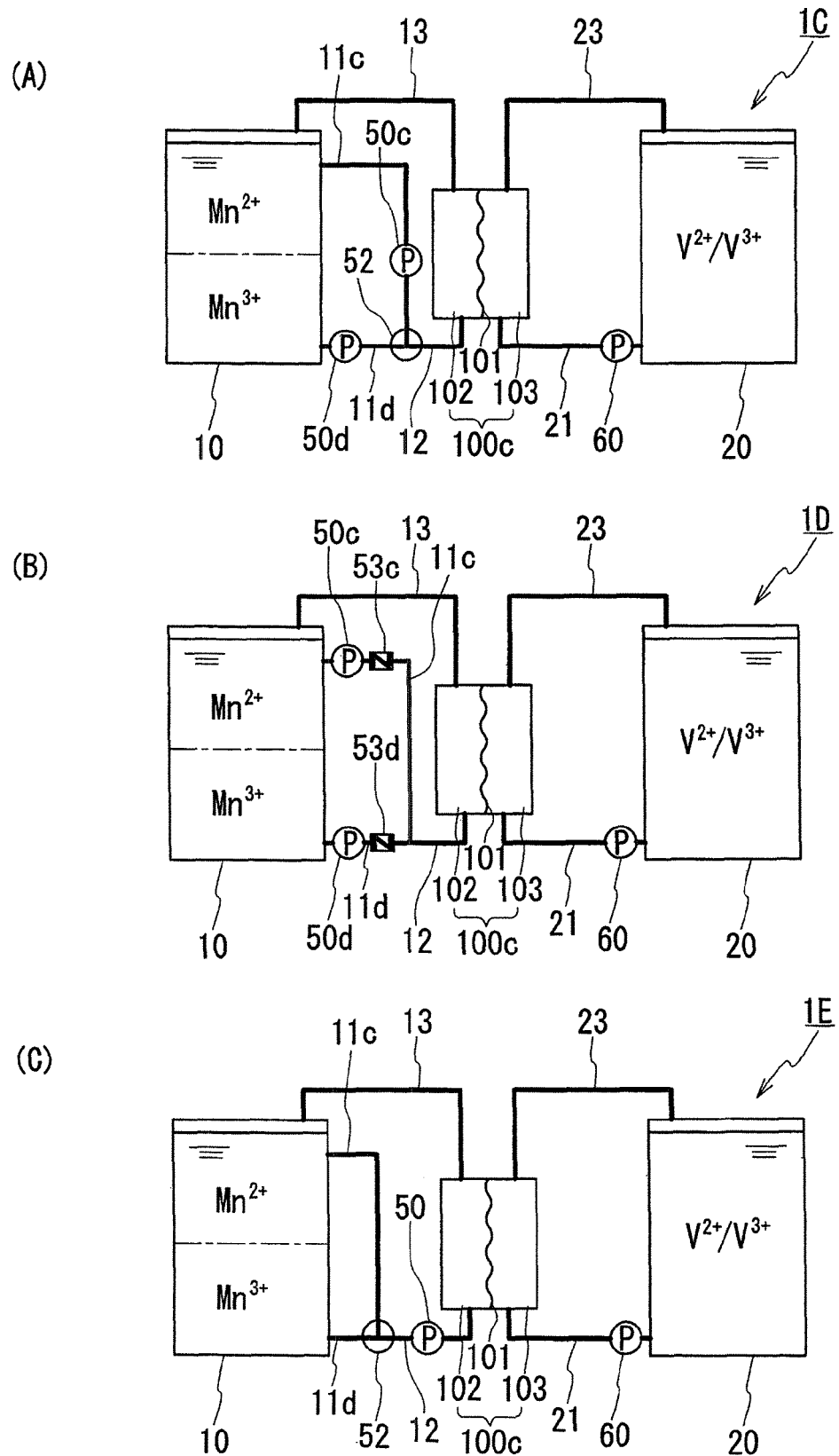
FIG. 3 is a schematic structural diagram of the redox flow battery according to the present invention, with FIG. 3(A) showing Embodiment 3, FIG. 3(B) showing Embodiment 4, and FIG. 3(C) showing Embodiment 5.
Figure 4:
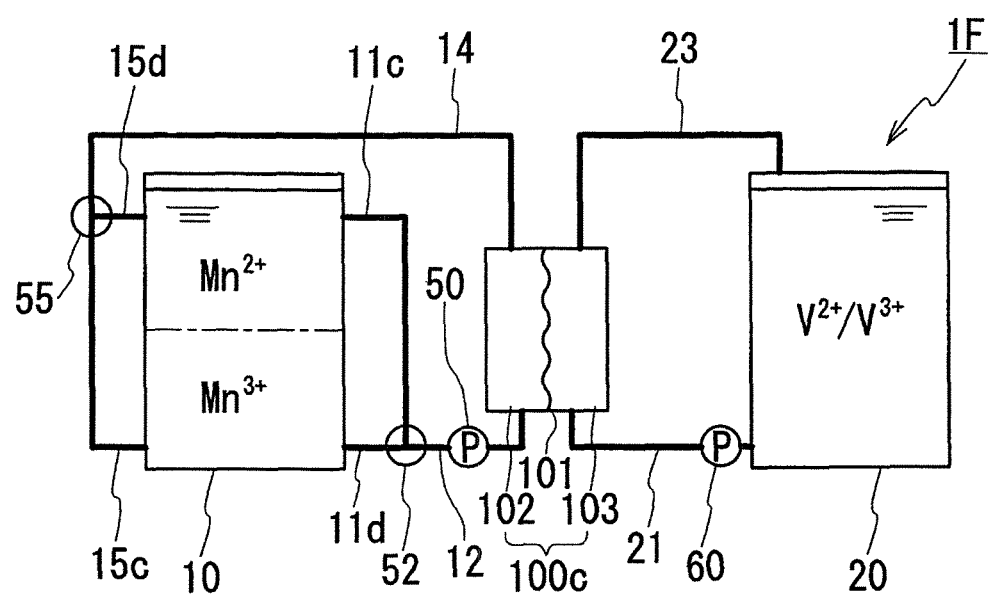
FIG. 4 is a schematic structural diagram of a redox flow battery according to Embodiment 6.

The negative electrode electrolyte contains, for example, as a negative electrode active material, at least one species of metal ion selected from a titanium ion, a vanadium ion, a chromium ion, a zinc ion, and a tin ion. A manganese-titanium-based RF battery and a manganese-tin-based RF battery containing a titanium ion and a tin ion can have an electromotive force of about 1.4V, a manganese-vanadiumbased RF battery containing a vanadium ion can have an electromotive force of about 1.8V, a manganese-chromium-based RF battery containing a chromium ion can have an electromotive force of about 1.9V, and a manganese-zinc-based RF battery containing a zinc ion can have a higher electromotive force of about 2.2V. FIGS. 2 to 4 illustrate a manganese-vanadium-based RF battery.

In the electrolyte of each of the positive and negative electrodes, the metal ion serving as an active material of the electrode preferably has a concentration of not less than 0.3M and not more than 5M (M: molarity). As for the solvent of each of the positive and negative electrolytes, it is preferable to use an aqueous solution containing at least one of sulfuric acid, phosphoric acid, nitric acid, sulfate, phosphate, and nitrate. Particularly, an aqueous solution containing sulfate anion ($SO_4^{2-}$) can be readily utilized. The acid preferably has a concentration of less than 5M.

[Pipe Arrangement]

A positive electrode charging pipe 11c and a positive electrode discharging pipe 11d are connected as two upstream pipes to a positive electrode tank 10 provided in RF battery 1A. Pipes 11c and 11d open to tank 10 at different positions.

Positive electrode charging pipe 11c has one end connected to positive electrode tank 10 at a position close to a liquid level of the positive electrode electrolyte in tank 10. More specifically, when the height of the liquid level from a bottom surface of positive electrode tank 10 is represented as Lp, the one end of positive electrode charging pipe 11c opens to a position higher than (Lp/2) from the bottom surface. In FIGS. 2 to 8, a solid line in positive electrode tank 10 indicates the liquid level, and a chain-dotted line in positive electrode tank 10 indicates the position of (Lp/2) from the bottom surface. Although the pipes are shown as having linearly bent shapes in FIGS. 2 to 8, they may have a curved shape, or may be connected to be simply inclined without being bent.

Positive electrode discharging pipe 11d has one end connected to positive electrode tank 10 at a position close to the bottom of tank 10. More specifically, the one end of positive electrode discharging pipe 11d opens to a position equal to or lower than (Lp/2) from the bottom surface of positive electrode tank 10.

In RF battery 1A, each of pipes 11c and 11d has the other end connected to battery element 100c. Pipes 11c and 11d are provided with positive electrode pumps 50c and 50d, respectively, to allow transfer of the positive electrode electrolyte in positive electrode tank 10 to battery element 100c by pressure.

RF battery 1A also includes a positive electrode return pipe 13 as a downstream pipe for returning the positive electrode electrolyte from battery element 100c to positive electrode tank 10. RF battery 1A further includes a negative electrode supply pipe 21 as an upstream pipe for supplying the negative electrode electrolyte in a negative electrode tank 20 to battery element 100c, a negative electrode return pipe 23 as a downstream pipe for returning the negative electrode electrolyte from battery element 100c to negative electrode tank 20, and a negative electrode pump 60 provided on negative electrode supply pipe 21.

[Operation Method]

A method of performing operation of charging and discharging RF battery 1A having the above-described structure will be specifically described. In the positive electrode electrolyte containing a manganese ion, charged manganese ions ($Mn^{3+}$) tend to be collected on the bottom side of positive electrode tank 10 due to their specific gravity, while non-charged manganese ions ($Mn^{2+}$) tend to be collected on the liquid level side of tank 10. Accordingly, during charge, the positive electrode electrolyte is supplied to battery element 100c via positive electrode charging pipe 11c attached to the liquid level side (upper side) of positive electrode tank 10 and positive electrode pump 50c. During discharge, on the other hand, the positive electrode electrolyte is supplied to battery element 100c via positive electrode discharging pipe 11d attached to the bottom side (lower side) of positive electrode tank 10 and positive electrode pump 50d.

If the negative electrode electrolyte of RF battery 1A contains a vanadium ion, for example, the ion concentration distribution resulting from the difference in specific gravity between the ions as with the manganese ions in the positive electrode electrolyte is unlikely to occur. In this case, therefore, as with a conventional all-vanadium RF battery, the negative electrode electrolyte may be supplied to battery element 100c via negative electrode supply pipe 21 and negative electrode pump 60 during operation of both charge and discharge.

[Effects]

In RF battery 1A using the positive electrode electrolyte containing a manganese ion, the positive electrode electrolyte can be efficiently utilized by using different pipes for supplying the electrolyte to battery element 100c between during charge and during discharge. Specifically, during charge of RF battery 1A, the positive electrode electrolyte collected on the liquid level side in positive electrode tank 10, namely, the positive electrode electrolyte containing a relatively large amount of manganese ions ($Mn^{2+}$) not sufficiently charged (discharged state), can be supplied to battery element 100c. During discharge of RF battery 1A, the positive electrode electrolyte collected on the bottom side in positive electrode tank 10, namely, the positive electrode electrolyte containing a relatively large amount of manganese ions ($Mn^{3+}$) sufficiently charged, can be supplied to battery element 100c. In RF battery 1A, therefore, overcharge can be reduced and sufficient charge time and discharge time can be ensured, thereby obtaining a high electromotive force over a long time.

Embodiment 2

An RF battery 1B in Embodiment 2 shown in FIG. 2(B) has a basic structure similar to that of RF battery 1A in Embodiment 1. RF battery 1B in Embodiment 2 is different in that it includes, in addition to the structure of RF battery 1A in Embodiment 1 shown in FIG. 2(A), on/off valves 51c and 51d provided on positive electrode charging pipe 11c and positive electrode discharging pipe 11d, respectively. This difference will be mainly described below, and the structure and effects common to RF battery 1A in Embodiment 1 will not be described in detail.

In RF battery 1B in Embodiment 2, a desired positive electrode electrolyte can be more reliably supplied to battery element 100c by operation of opening/closing on/off valves 51c and 51d, in addition to the control of supply of the positive electrode electrolyte by driving/stopping positive electrode pumps 50c and 50d. More specifically, during charge, the positive electrode electrolyte can be supplied from the liquid level side of positive electrode tank 10 to battery element 100c by opening on/off valve 51c provided on positive electrode charging pipe 11c and by closing on/off valve 51d provided on positive electrode discharging pipe 11d. During discharge, the positive electrode electrolyte can be supplied from the bottom side of positive electrode tank 10 to battery element 100c by opening on/off valve 51d provided on positive electrode discharging pipe 11d and by closing on/off valve 51c provided on positive electrode charging pipe 11c.

In addition, the operation of opening/closing on/off valves 51c and 51d can prevent the backflow of the positive electrode electrolyte. In RF battery 1B in Embodiment 2, therefore, the mixing of the positive electrode electrolytes having different specific gravities can be suppressed, thereby further increasing utilization efficiency of the electrolyte.

Electromagnetic valves or the like may be used as on/off valves 51c and 51d. Instead of or in addition to on/off valves 51c and 51d, a check valve may be used as in Embodiment 4 to be described later (FIG. 3(B)). In this case, too, the mixing of the electrolytes due to the backflow can be prevented as described above. These points are applicable to Embodiment 8 to be described later (FIG. 5(B)) where on/off valves 61c and 61d are provided.

Embodiments 3 to 5

Referring to FIG. 3, another embodiment of upstream pipes on the positive electrode side will be described. RF batteries 1C to 1E in Embodiments 3 to 5 shown in FIG. 3 each has a basic structure similar to that of RF battery 1A in Embodiment 1, and a main difference lies in the arrangement of upstream pipes on the positive electrode side. This difference will be mainly described below, and the structure and effects common to RF battery 1A in Embodiment 1 will not be described in detail.

As with RF battery 1A in Embodiment 1, in each of RF batteries 1C to 1E in Embodiments 3 to 5, positive electrode charging pipe 11c is connected to the liquid level side (upper side) of positive electrode tank 10, and positive electrode discharging pipe 11d is connected to the bottom side (lower side) of positive electrode tank 10. However, each of pipes 11c and 11d has the other end connected to one end of a single positive electrode common pipe 12. Positive electrode common pipe 12 has the other end connected to battery element 100c. The positive electrode electrolyte from each of pipes 11c and 11d is supplied to battery element 100c via positive electrode common pipe 12. RF batteries 1C to 1E including positive electrode common pipe 12 has a low number of pipes connected to battery element 100c and can thus have a simple structure.

In RF battery 1C in Embodiment 3 shown in FIG. 3(A), positive electrode charging pipe 11c and positive electrode discharging pipe 11d are provided with positive electrode pumps 50c and 50d, respectively, and positive electrode common pipe 12 is provided with a three-way valve 52 at a position where positive electrode common pipe 12 is connected to both pipes 11c and 11d.

In RF battery 1C in Embodiment 3 having the above-described structure, by switching three-way valve 52, the positive electrode electrolyte from positive electrode charging pipe 11c can be supplied using positive electrode pump 50c during charge, and the positive electrode electrolyte from positive electrode discharging pipe 11d can be supplied using positive electrode pump 50d during discharge, respectively, to battery element 100c via positive electrode common pipe 12. Particularly, in RF battery 1C, the mere switching of three-way valve 52 can prevent the backflow of the positive electrode electrolyte to avoid the mixing of the electrolytes having different specific gravities. As such, RF battery 1C has a low number of components and thus has a simple structure.

In RF battery 1D in Embodiment 4 shown in FIG. 3(B), three-way valve 52 is not provided, and positive electrode charging pipe 11c and positive electrode discharging pipe 11d are provided with positive electrode pumps 50c, 50d and check valves 53c, 53d, respectively.

In RF battery 1D in Embodiment 4 having the above-described structure, check valves 53c and 53d can prevent the backflow of the positive electrode electrolyte to suppress the mixing of the electrolytes having different specific gravities, without the switching operation as in the case where three-way valve 52 is provided. Accordingly, RF battery 1D has excellent workability during operation.

Instead of or in addition to check valves 53c and 53d, the on/off valves as were described in Embodiment 2 can be provided. This point is applicable to Embodiment 10 to be described later (FIG. 6(B)) where check valves 63c and 63d are provided.

In RF battery 1E in Embodiment 5 shown in FIG. 3(C), positive electrode common pipe 12 connected to positive electrode charging pipe 11c and positive electrode discharging pipe 11d is provided with three-way valve 52 at a position where positive electrode common pipe 12 is connected to both pipes 11c and 11d. Additionally, in RF battery 1E in Embodiment 5, positive electrode common pipe 12 is provided with a single positive electrode pump 50 between three-way valve 52 and battery element 100c, and no pump is provided on pipes 11c and 11d.

In RF battery 1E in Embodiment 5 having the above-described structure, by switching three-way valve 52, the positive electrode electrolyte from positive electrode charging pipe 11c can be supplied during charge, and the positive electrode electrolyte from positive electrode discharging pipe 11d can be supplied during discharge, respectively, to battery element 100c via positive electrode common pipe 12. Particularly, in RF battery 1E, the electrolyte can be transferred by pressure by single positive electrode pump 50 during both charge and discharge. Furthermore, in RF battery 1E, as with RF battery 1C in Embodiment 3 (FIG. 3(A)), the mere switching of three-way valve 52 can prevent the backflow of the positive electrode electrolyte to suppress the mixing of the electrolytes having different specific gravities. As such, RF battery 1E in Embodiment 5 has a lower number of components and thus has a simpler structure.

Embodiment 6

Referring to FIG. 4, another embodiment of downstream pipes on the positive electrode side will be described. An RF battery 1F in Embodiment 6 shown in FIG. 4 has a basic structure similar to that of RF battery 1E in Embodiment 5 (FIG. 3(C)), and a main difference lies in the arrangement of downstream pipes on the positive electrode side. This difference will be mainly described below, and the structure and effects common to RF battery 1E in Embodiment 5 will not be described in detail.

Downstream pipes on the positive electrode side of RF battery 1F in Embodiment 6 include a positive electrode charging return pipe 15c and a positive electrode discharging return pipe 15d connected to positive electrode tank 10, and a positive electrode common return pipe 14 connected to one end of each of return pipes 15c and 15d and to battery element 100c.

Positive electrode charging return pipe 15c has one end connected to the bottom side, namely, a position equal to or lower than (Lp/2), of positive electrode tank 10, and the other end connected to one end of positive electrode common return pipe 14. Positive electrode discharging return pipe 15d has one end connected to the liquid level side, namely, a position higher than (Lp/2), of positive electrode tank 10, and the other end connected to the one end of positive electrode common return pipe 14. Positive electrode common return pipe 14 has the other end connected to battery element 100c. In this example, positive electrode common return pipe 14 is provided with a three-way valve 55 at a position where positive electrode common return pipe 14 is connected to both return pipes 15c and 15d.

In RF battery 1F in Embodiment 6 having the above-described structure, by switching three-way valve 55, during charge, the positive electrode electrolyte in a charged state from battery element 100c can be delivered to the bottom side of positive electrode tank 10 through positive electrode common return pipe 14 and via positive electrode charging return pipe 15c. Namely, the positive electrode electrolyte in a charged state can be efficiently collected in a region in positive electrode tank 10 where the positive electrode electrolyte in a charged state has been collected. Thus, the mixing of the positive electrode electrolyte in a charged state with the positive electrode electrolyte not sufficiently charged can be readily suppressed, to keep the positive electrode electrolyte not sufficiently charged on the liquid level side of tank 10. In RF battery 1F in Embodiment 6, therefore, the positive electrode electrolyte not sufficiently charged can be efficiently supplied to battery element 100c via positive electrode charging pipe 11c during charge, thereby ensuring a sufficient charge time and preventing overcharge.

In RF battery 1F, by switching three-way valve 55, during discharge, the positive electrode electrolyte in a discharged state from battery element 100c can be delivered to the liquid level side of positive electrode tank 10 through positive electrode common return pipe 14 and via positive electrode discharging return pipe 15d. Namely, the positive electrode electrolyte in a discharged state can be efficiently collected in a region in positive electrode tank 10 where the positive electrode electrolyte not sufficiently charged (discharged state) has been collected. Thus, in RF battery 1F, the mixing of the positive electrode electrolyte in a charged state with the positive electrode electrolyte in a discharged state can be suppressed, to keep the positive electrode electrolyte in a charged state on the bottom side of tank 10 during discharge as well. In RF battery 1F in Embodiment 6, therefore, the positive electrode electrolyte in a charged state can be efficiently supplied to battery element 100c via positive electrode discharging pipe 11d during discharge, thereby ensuring a sufficient discharge time.

Although positive electrode common return pipe 14 is provided in Embodiment 6, the common return pipe may be removed, and both positive electrode charging return pipe 15c and positive electrode discharging return pipe 15d may be connected to battery element 100c. In this case, if each of return pipes 15c and 15d is provided with an on/off valve and a check valve, the backflow can be prevented to avoid the mixing of the electrolytes having different specific gravities. This point is applicable to Embodiment 11 to be described later (FIG. 7) where a negative electrode common return pipe 24, a negative electrode charging return pipe 25c and a negative electrode discharging return pipe 25d are provided.

Although FIG. 4 shows an upstream pipe on the positive electrode side as including positive electrode common pipe 12, three-way valve 52 and single positive electrode pump 50 described in Embodiment 5 (FIG. 3(C)), the upstream pipe may be replaced by the upstream pipes on the positive electrode side in Embodiments 1 to 4 described above.

Embodiment 7

Figure 5:
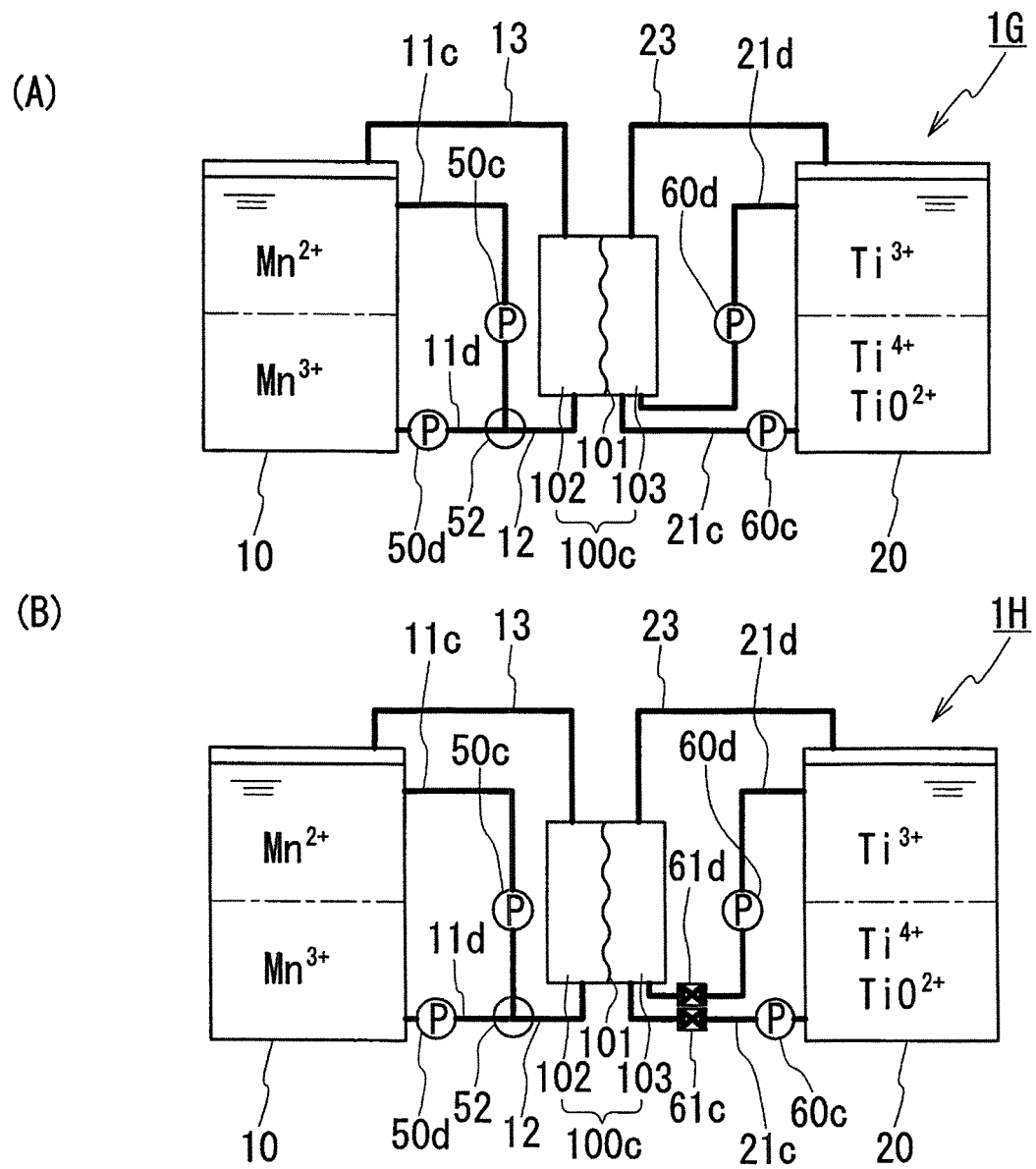
FIG. 5 is a schematic structural diagram of the redox flow battery according to the present invention, with FIG. 5(A) showing Embodiment 7 and FIG. 5(B) showing Embodiment 8.

Referring to FIG. 5, another embodiment of upstream pipes on the negative electrode side will be described. An RF battery 1G in Embodiment 7 shown in FIG. 5(A) has battery element 100c and a pipe arrangement on the positive electrode side similar to those of RF battery 1C in Embodiment 3 (FIG. 3(A)). Namely, RF battery 1G includes positive electrode charging pipe 11c, positive electrode discharging pipe 11d, positive electrode common pipe 12, two positive electrode pumps 50c and 50d, and three-way valve 52. RF battery 1G in Embodiment 7 is characterized by using an electrolyte containing a titanium ion as a negative electrode active material as a negative electrode electrolyte, and by including two upstream pipes on the negative electrode side. These characteristic points will be mainly described below, and the structure and effects common to RF battery 1C in Embodiment 3 will not be described in detail.

[Electrolytes]

The negative electrode electrolyte contains at least one species of titanium ion selected from a trivalent titanium ion ($Ti^{3+}$) and a tetravalent titanium ion (such as $Ti^{4+}$, $TiO^{2+}$). The negative electrode electrolyte may contain a divalent titanium ion.

Figure 6:
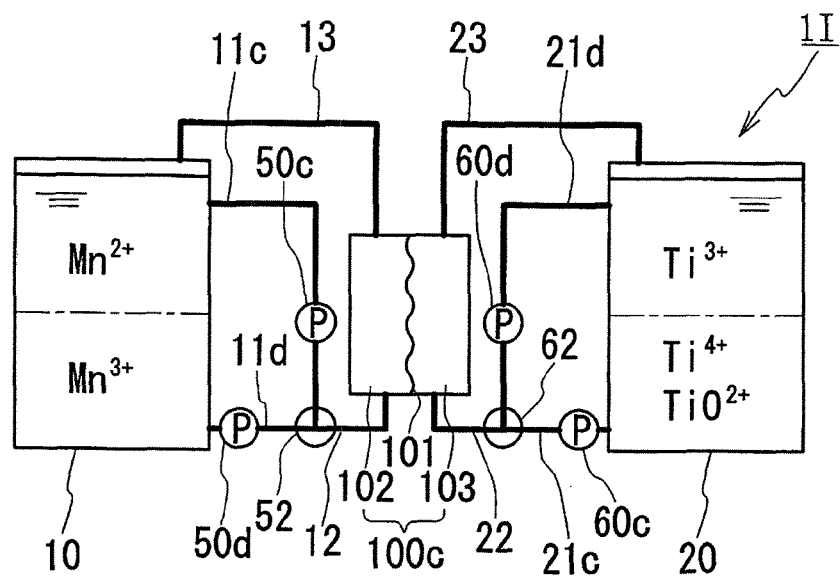
FIG. 6 is a schematic structural diagram of the redox flow battery according to the present invention, with FIG. 6(A) showing Embodiment 9 and FIG. 6(B) showing Embodiment 10.
Figure 6:
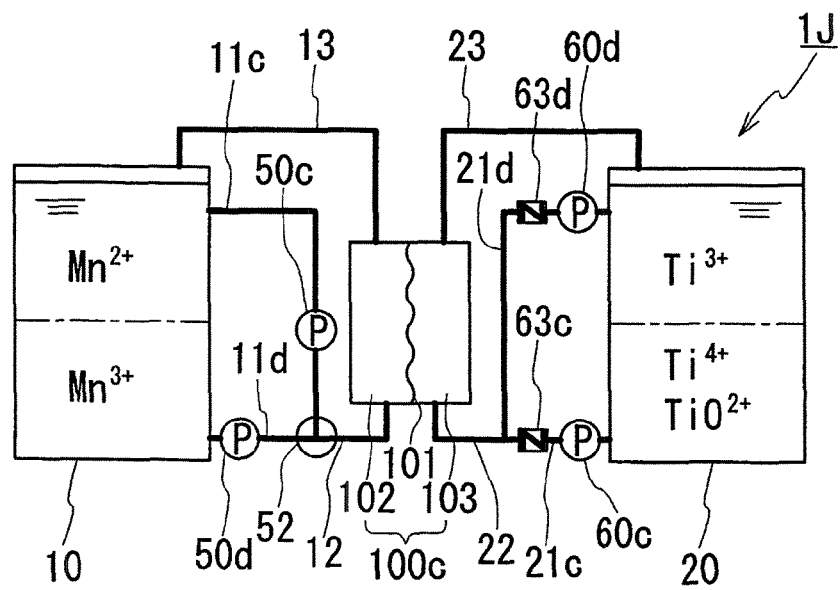
Figure 7:
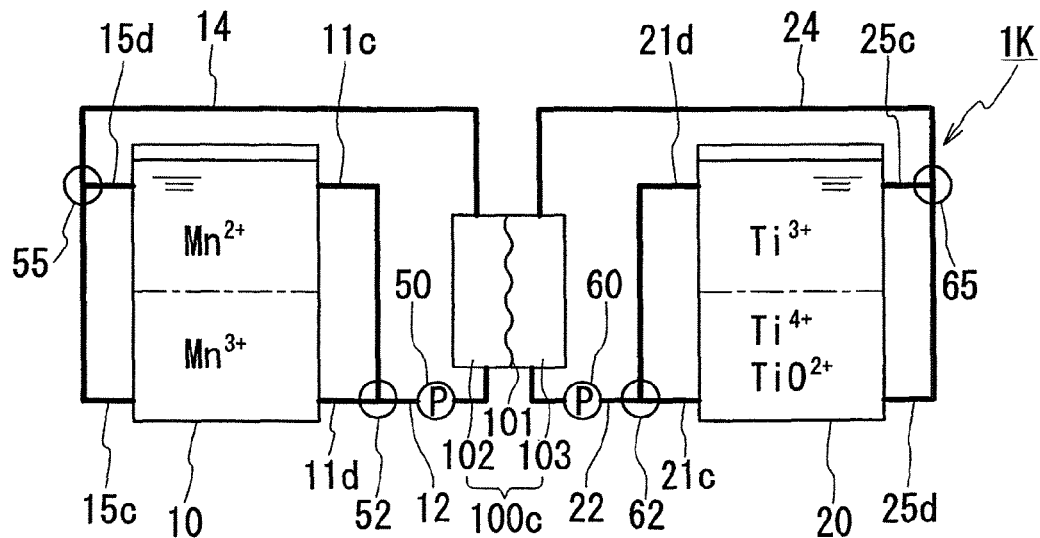
FIG. 7 is a schematic structural diagram of a redox flow battery according to Embodiment 11.

As for the positive electrode electrolyte, for example, the manganese ions as described above can be suitably used as a positive electrode active material. Additionally, the positive electrode electrolyte contains, for example, an iron ion, a vanadium ion, a titanium ion as a positive electrode active material. FIGS. 5 to 7 illustrate a manganese-titanium-based RF battery.

A study by the present inventors found that, in a manganese-titanium-based RF battery, a certain amount of titanium ions on the negative electrode side is mixed in the positive electrode electrolyte due to liquid migration over time, thus suppressing the deposition of $MnO_2$ and stabilizing $Mn^{3+}$. Thus, a manganese-titanium-based RF battery can have a high electromotive force even if the liquid migration occurs.

[Pipe Arrangement]

A negative electrode charging pipe 21c and a negative electrode discharging pipe 21d are connected as two upstream pipes to negative electrode tank 20 provided in RF battery 1G. Pipes 21c and 21d open to tank 20 at different positions.

Figure 8:
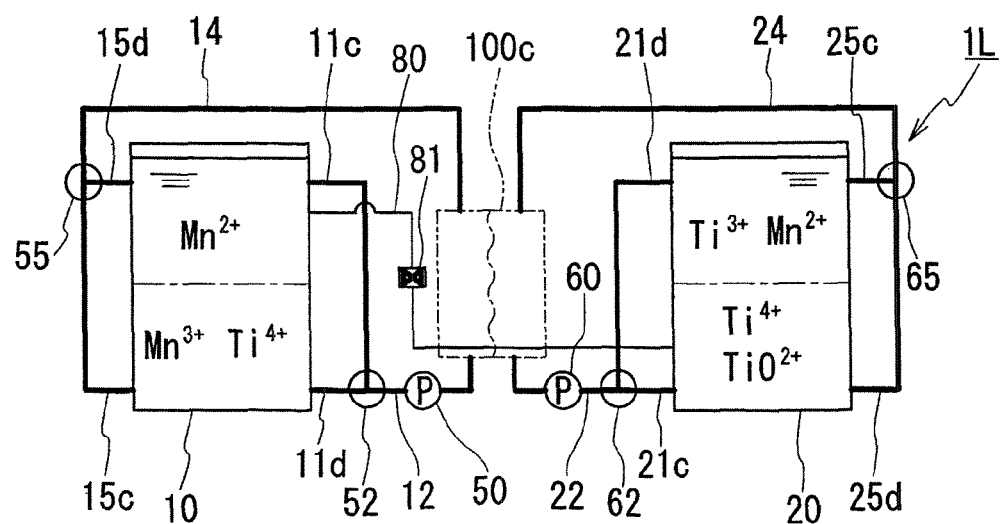
FIG. 8 is a schematic structural diagram of a redox flow battery according to Embodiment 12.

Negative electrode charging pipe 21c has one end connected to negative electrode tank 20 at a position close to the bottom of negative electrode tank 20. More specifically, when the height of the liquid level from a bottom surface of negative electrode tank 20 is represented as La, the one end of negative electrode charging pipe 21c opens to a position equal to or lower than (La/2) from the bottom surface. In FIGS. 6 to 8, a solid line in negative electrode tank 20 indicates the liquid level, and a chain-dotted line in negative electrode tank 20 indicates the position of (La/2) from the bottom surface.

Negative electrode discharging pipe 21d has one end connected to negative electrode tank 20 at a position close to the liquid level of the negative electrode electrolyte in negative electrode tank 20. More specifically, the one end of negative electrode discharging pipe 21d opens to a position higher than (La/2) from the bottom surface of negative electrode tank 20.

In RF battery 1G, each of pipes 21c and 21d has the other end connected to battery element 100c. Pipes 21c and 21d are provided with negative electrode pumps 60c and 60d, respectively, to allow transfer of the negative electrode electrolyte in negative electrode tank 20 to battery element 100c by pressure. RF battery 1G further includes negative electrode return pipe 23 as a downstream pipe on the negative electrode side.

In other words, the upstream pipes on the negative electrode side provided in RF battery 1G in Embodiment 7 are structurally similar to the upstream pipes on the positive electrode side provided in RF battery 1A in Embodiment 1 (FIG. 2(A)), with the connection position (opening position) to the tank of the pipe used during charge and the connection position (opening position) to the tank of the pipe used during discharge being reversed in an upside down manner between the positive and negative electrodes.

[Operation Method]

A method of performing operation of charging and discharging RF battery 1G having the above-described structure will be specifically described. In the negative electrode electrolyte containing a titanium ion, charged titanium ions ($Ti^{3+}$) tend to be collected on the liquid level side of negative electrode tank 20 due to their specific gravity, while non-charged titanium ions (such as $Ti^{4+}$) tend to be collected on the bottom side of tank 20. Accordingly, during charge, the negative electrode electrolyte is supplied to battery element 100c via negative electrode charging pipe 21c attached to the bottom side (lower side) of negative electrode tank 20 and negative electrode pump 60c. During discharge, on the other hand, the negative electrode electrolyte is supplied to battery element 100c via negative electrode discharging pipe 21d attached to the liquid level side (upper side) of negative electrode tank 20 and negative electrode pump 60d.

If the positive electrode electrolyte of RF battery 1G contains a vanadium ion, for example, the ion concentration distribution resulting from the difference in specific gravity between the ions as with the titanium ions in the negative electrode electrolyte is unlikely to occur. In this case, therefore, the pipe arrangement on the positive electrode side may include a positive electrode supply pipe (not shown) as an upstream pipe, and positive electrode return pipe 13 as a downstream pipe. The positive electrode supply pipe may be provided with a positive electrode pump (not shown). Then, as with a conventional all-vanadium RF battery, the positive electrode electrolyte may be supplied to battery element 100c via the positive electrode supply pipe and the positive electrode pump during operation of both charge and discharge. This point is likewise applicable to Embodiments 8 to 11 to be described later (FIGS. 5(B) to 7).

If the positive electrode electrolyte of RF battery 1G contains a manganese ion as was described in Embodiment 1, on the other hand, positive electrode charging pipe 11c and positive electrode discharging pipe 11d are provided as shown in FIG. 5(A). Then, as was described in Embodiment 1 and the like, the positive electrode electrolyte may be supplied to battery element 100c by using positive electrode charging pipe 11c during charge and by using positive electrode discharging pipe 11d during discharge, respectively. Although FIG. 5 and FIG. 6 to be described later show pipe arrangements on the positive electrode side similar to that of Embodiment 3 shown in FIG. 3(A), the arrangements may be replaced by those described in Embodiments 1, 2, and 4 to 6.

[Effects]

In RF battery 1G using the negative electrode electrolyte containing a titanium ion, the negative electrode electrolyte can be efficiently utilized by using different pipes for supplying the electrolyte to battery element 100c between during charge and during discharge. Specifically, during charge of RF battery 1G, the negative electrode electrolyte collected on the bottom side in negative electrode tank 20, namely, the negative electrode electrolyte containing a relatively large amount of titanium ions (such as $Ti^{4+}$) not sufficiently charged (discharged state), can be supplied to battery element 100c. During discharge of RF battery 1G, the negative electrode electrolyte collected on the liquid level side in negative electrode tank 20, namely, the negative electrode electrolyte containing a relatively large amount of titanium ions ($Ti^{3+}$) sufficiently charged, can be supplied to battery element 100c. In RF battery 1G, therefore, overcharge can be reduced and sufficient charge time and discharge time can be ensured, thereby obtaining a high electromotive force over a long time.

Particularly, in RF battery 1G in Embodiment 7 using the positive electrode electrolyte containing a manganese ion as a positive electrode active material, and including positive electrode charging pipe 11c and positive electrode discharging pipe 11d, different pipes can also be used for delivering the positive electrode electrolyte to battery element 100c between during charge and during discharge. In RF battery 1G in Embodiment 7, therefore, the electrolytes of both the positive and negative electrodes can be efficiently utilized over a long time to obtain a high electromotive force.

Embodiment 8

An RF battery 1H in Embodiment 8 shown in FIG. 5(B) has a basic structure similar to that of RF battery 1G in Embodiment 7. RF battery 1H shown in FIG. 5(B) includes, in addition to the structure of RF battery 1G in Embodiment 7, on/off valves 61c and 61d provided on negative electrode charging pipe 21c and negative electrode discharging pipe 21d, respectively. Namely, the upstream pipes on the negative electrode side provided in RF battery 1H in Embodiment 8 are structurally similar to the upstream pipes on the positive electrode side provided in RF battery 1B in Embodiment 2 (FIG. 2(B)), with different connection positions (opening positions) to negative electrode tank 20 of pipes 21c and 21d.

In RF battery 1H in Embodiment 8 including on/off valves 61c and 61d, as with RF battery 1B in Embodiment 2, supply of the negative electrode electrolyte can be controlled by operation of opening/closing on/off valves 61c and 61d, in addition to the operation of driving/stopping negative electrode pumps 60c and 60d. Specifically, during charge, the negative electrode electrolyte can be supplied from the bottom side of negative electrode tank 20 to battery element 100c by opening on/off valve 61c provided on negative electrode charging pipe 21c and by closing on/off valve 61d provided on negative electrode discharging pipe 21d. During discharge, the negative electrode electrolyte can be supplied from the liquid level side of negative electrode tank 20 to battery element 100c by opening on/off valve 61d provided on negative electrode discharging pipe 21d and by closing on/off valve 61c provided on negative electrode charging pipe 21c. In addition, the operation of opening/closing on/off valves 61c and 61d can prevent the backflow of the negative electrode electrolyte to avoid the mixing of the negative electrode electrolytes having different specific gravities. In RF battery 1H in Embodiment 8, therefore, utilization efficiency of the electrolyte can be further increased.

Embodiments 9 and 10

Referring to FIG. 6, another embodiment of upstream pipes on the negative electrode side will be described. RF batteries 1I and 1J in Embodiments 9 and 10 shown in FIG.

6 each has a basic structure similar to that of RF battery 1G in Embodiment 7 (FIG. 5(A)), and a main difference lies in the arrangement of upstream pipes on the negative electrode side. This difference will be mainly described below, and the structure and effects common to RF battery 1G in Embodiment 7 will not be described in detail.

As with RF battery 1G in Embodiment 7, in each of RF batteries 1I and 1J in Embodiments 9 and 10, negative electrode discharging pipe 21d is connected to the liquid level side (upper side) of negative electrode tank 20, and negative electrode charging pipe 21c is connected to the bottom side (lower side) of negative electrode tank 20. However, each of pipes 21c and 21d has the other end connected to one end of a single negative electrode common pipe 22. Negative electrode common pipe 22 has the other end connected to battery element 100c. The negative electrode electrolyte from each of pipes 21c and 21d is supplied to battery element 100c via negative electrode common pipe 22. RF batteries 1I and 1J including negative electrode common pipe 22 has a low number of pipes connected to battery element 100c and can thus have a simple structure.

In RF battery 1I in Embodiment 9 shown in FIG. 6(A), negative electrode charging pipe 21c and negative electrode discharging pipe 21d are provided with negative electrode pumps 60c and 60d, respectively, and negative electrode common pipe 22 is provided with a three-way valve 62 at a position where negative electrode common pipe 22 is connected to both pipes 21c and 21d. Namely, the upstream pipes on the negative electrode side provided in RF battery 1I in Embodiment 9 are structurally similar to the upstream pipes on the positive electrode side (positive electrode charging pipe 11c, positive electrode discharging pipe 11d, positive electrode common pipe 12, positive electrode pumps 50c and 50d, and three-way valve 52).

In RF battery 1I in Embodiment 9 having the above-described structure, by switching three-way valve 62, the negative electrode electrolyte from negative electrode charging pipe 21c can be supplied using negative electrode pump 60c during charge, and the negative electrode electrolyte from negative electrode discharging pipe 21d can be supplied using negative electrode pump 60d during discharge, respectively, to battery element 100c via negative electrode common pipe 22. Namely, RF battery 1I in Embodiment 9 is structured such that the electrolytes of both the positive and negative electrodes are supplied to battery element 100c by using positive electrode common pipe 12 and negative electrode common pipe 22 in both the positive and negative electrodes. Particularly, in RF battery 1I, the mere switching of three-way valves 52 and 62 can prevent the backflow of the positive electrode electrolyte and the backflow of the negative electrode electrolyte to avoid the mixing of the electrolytes having different specific gravities in both the positive and negative electrodes. As such, RF battery 1I has a lower number of components and thus has a simpler structure.

In RF battery 1J in Embodiment 10 shown in FIG. 6(B), three-way valve 62 is not provided, and negative electrode charging pipe 21c and negative electrode discharging pipe 21d are provided with negative electrode pumps 60c, 60d and check valves 63c, 63d, respectively. Namely, the upstream pipes on the negative electrode side provided in RF battery 1J in Embodiment 10 are structurally similar to the upstream pipes on the positive electrode side in RF battery 1D in Embodiment 4 shown in FIG. 3(B).

As with RF battery 1I in Embodiment 9, in RF battery 1J in Embodiment 10 having the above-described structure, check valves 63c and 63d can prevent the backflow of the negative electrode electrolyte to suppress the mixing of the electrolytes having different specific gravities, without switching operation of a three-way valve. Accordingly, RF battery 1J has excellent workability during operation.

Embodiment 11

Referring to FIG. 7, another embodiment of upstream pipes on the negative electrode side will be described. In an RF battery 1K in Embodiment 11 shown in FIG. 7, negative electrode common pipe 22 connected to negative electrode charging pipe 21c and negative electrode discharging pipe 21d is provided with single negative electrode pump 60, and pipes 21c and 21d are not provided with a pump. Negative electrode common pipe 22 is provided with three-way valve 62 at a position where negative electrode common pipe 22 is connected to both pipes 21c and 21d.

The upstream pipes on the positive electrode side of RF battery 1K in Embodiment 11 are structurally similar to the upstream pipes on the positive electrode side of RF battery 1E in Embodiment 5 shown in FIG. 3(C), and include positive electrode charging pipe 11c, positive electrode discharging pipe 11d, positive electrode common pipe 12, single positive electrode pump 50, and three-way valve 52. Namely, in RF battery 1K in Embodiment 11, the upstream pipes on the negative electrode side are structurally similar to the upstream pipes on the positive electrode side, with different opening positions to tanks 10 and 20 of the pipes used during charge and discharge between the positive and negative electrodes. The upstream pipes on the positive electrode side may be replaced by the upstream pipes on the positive electrode side in Embodiments 1 to 4 described above.

In RF battery 1K in Embodiment 11 having the above-described structure, by switching three-way valve 62, the negative electrode electrolyte from negative electrode charging pipe 21c can be supplied during charge, and the negative electrode electrolyte from negative electrode discharging pipe 21d can be supplied during discharge, respectively, to battery element 100c via negative electrode common pipe 22. Particularly, in RF battery 1K, the electrolyte can be transferred by pressure by single negative electrode pump 60 during both charge and discharge. Furthermore, in RF battery 1K, as with RF battery 1I in Embodiment 9 (FIG. 6(A)), the mere switching of three-way valve 62 can prevent the backflow of the negative electrode electrolyte to suppress the mixing of the electrolytes having different specific gravities. As such, RF battery 1K in Embodiment 11 has a lower number of components and thus has a simpler structure. Particularly, RF battery 1K in Embodiment 11 includes positive electrode common pipe 12 with single positive electrode pump 50 also in the upstream pipes on the positive electrode side, and thus has an even lower number of components and an even simpler structure.

Furthermore, in RF battery 1K in Embodiment 11, each of downstream pipes on both the positive and negative electrodes includes two pipes, namely, the charging return pipe and the discharging return pipe. Specifically, downstream pipes on the positive electrode side of RF battery 1K include, as with RF battery 1F in Embodiment 6 shown in FIG. 4, positive electrode common return pipe 14, positive electrode charging return pipe 15c, positive electrode discharging return pipe 15d, and three-way valve 55. Additionally, downstream pipes on the negative electrode side of RF battery 1K include negative electrode charging return pipe 25c and negative electrode discharging return pipe 25d connected to negative electrode tank 20, and negative electrode common return pipe 24 connected to one end of each of return pipes 25c and 25d and to battery element 100c.

Negative electrode charging return pipe 25c has one end connected to the liquid level side, namely, a position higher than (La/2), of negative electrode tank 20, and the other end connected to negative electrode common return pipe 24. Negative electrode discharging return pipe 25d has one end connected to the bottom side, namely, a position equal to or lower than La/2, of tank 20, and the other end connected to negative electrode common return pipe 24. Negative electrode common return pipe 24 has the other end connected to battery element 100c. In this example, negative electrode common return pipe 24 is provided with a three-way valve 65 at a position where negative electrode common return pipe 24 is connected to both return pipes 25c and 25d.

In RF battery 1K in Embodiment 11 having the above-described structure, by switching three-way valve 65, during charge, the negative electrode electrolyte in a charged state from battery element 100c can be delivered to the liquid level side of negative electrode tank 20 through negative electrode common return pipe 24 and via negative electrode charging return pipe 25c. Namely, the negative electrode electrolyte in a charged state can be efficiently collected in a region in negative electrode tank 20 where the negative electrode electrolyte in a charged state has been collected. Thus, the mixing of the negative electrode electrolyte in a charged state with the negative electrode electrolyte not sufficiently charged can be readily suppressed, to keep the negative electrode electrolyte not sufficiently charged on the bottom side of tank 20. In RF battery 1K in Embodiment 11, therefore, the negative electrode electrolyte not sufficiently charged can be efficiently supplied to battery element 100c via negative electrode charging pipe 21c during charge, thereby ensuring a sufficient charge time and preventing overcharge.

In RF battery 1K, by switching three-way valve 65, during discharge, the negative electrode electrolyte in a discharged state from battery element 100c can be delivered to the bottom side of negative electrode tank 20 through negative electrode common return pipe 24 and via negative electrode discharging return pipe 25d. Namely, the negative electrode electrolyte in a discharged state can be efficiently collected in a region in negative electrode tank 20 where the negative electrode electrolyte not sufficiently charged (discharged state) has been collected. Thus, in RF battery 1K, the mixing of the negative electrode electrolyte in a charged state with the negative electrode electrolyte in a discharged state can be suppressed, to keep the negative electrode electrolyte in a charged state on the liquid level side of tank 20 during discharge as well. In RF battery 1K in Embodiment 11, therefore, the negative electrode electrolyte in a charged state can be efficiently supplied to battery element 100c via negative electrode discharging pipe 21d during discharge, thereby ensuring a sufficient discharge time.

Particularly, in RF battery 1K in Embodiment 11 including the plurality of return pipes 15c and 15d as the downstream pipes on the positive electrode side as described above, the electrolyte in a non-charged state can be supplied during charge, and the electrolyte in a charged state can be supplied during discharge, respectively, to battery element 100c efficiently for both the positive and negative electrodes. As such, RF battery 1K can be charged and discharged well over a long time.

In RF battery 1K in Embodiment 11, only positive electrode return pipe 13 (see FIGS. 2, 3 and the like) may be provided as the downstream pipe on the positive electrode side, or only negative electrode return pipe 23 (see FIGS. 2, 3 and the like) may be provided as the downstream pipe on the negative electrode side, or positive electrode return pipe 13 and negative electrode return pipe 23 may be provided as the downstream pipes of both the positive and negative electrodes, respectively. This point is likewise applicable to an RF battery 1L in Embodiment 12 to be described later.

Embodiment 12

Referring to FIG. 8, RF battery 1L in Embodiment 12 including a connection pipe will be described. RF battery 1L has a basic structure similar to that of RF battery 1K in Embodiment 11 shown in FIG. 7. Namely, RF battery 1L includes positive electrode charging pipe 11c and positive electrode discharging pipe 11d as upstream pipes on the positive electrode side, and negative electrode charging pipe 21c and negative electrode discharging pipe 21d as upstream pipes on the negative electrode side. RF battery 1L further includes a connection pipe 80 connecting the liquid phase in positive electrode tank 10 to the liquid phase in negative electrode tank 20. In RF battery 1L, the positive electrode electrolyte and the negative electrode electrolyte contain the same metal ion species. Connection pipe 80 and the electrolytes that are characteristic of RF battery 1L will be mainly described below, and the structure and effects common to RF battery 1K in Embodiment 11 will not be described in detail.

In an embodiment where electrolytes of both the positive and negative electrodes contain the same metal ion species, for example, if liquid migration over time causes variation in the amount of the electrolytes and variation in concentration of the metal ions, the variations can be readily corrected by mixing the electrolytes of both electrodes together. When mixing the electrolytes, if a pipe (connection pipe) connecting the tanks of both electrodes together is provided, the electrolytes can be readily mixed. Furthermore, manufacturability of the electrolytes of both electrodes is excellent when the electrolytes contain only the same metal ion species.

For example, the electrolytes of both the positive and negative electrodes contain a manganese ion and a titanium ion. In this case, in the positive electrode, the manganese ion is utilized as a positive electrode active material, while the titanium ion is contained to attain the same metal ion species and also has the function of suppressing the deposition of $MnO_2$ by disproportionation reaction of $Mn^{3+}$. The present inventors found that the deposition can be effectively suppressed by containing a manganese ion as well as a titanium ion in the positive electrode electrolyte. In the negative electrode, the titanium ion is utilized as a negative electrode active material, while the manganese ion is contained to attain the same metal ion species. FIG. 8 shows ions in positive electrode tank 10 and negative electrode tank 20 for illustrative purposes.

Connection pipe 80 has one end connected to a position close to a liquid level of the positive electrode electrolyte in positive electrode tank 10, and the other end connected to a position close to the bottom of negative electrode tank 20. In this example, the other end of connection pipe 80 connected to negative electrode tank 20 is at a position lower than the one end connected to positive electrode tank 10. In this example, connection pipe 80 is provided with an on/off valve 81 to allow switching between the connection and disconnection between positive electrode tank 10 and negative electrode tank 20 when desired. An electromagnetic valve or the like may be used as on/off valve 81.

As described above, the positive electrode electrolyte containing a relatively large amount of manganese ions in a discharged state exists on the liquid level side of the positive electrode electrolyte in positive electrode tank 10, while the negative electrode electrolyte containing a relatively large amount of titanium ions in a discharged state exists on the bottom side of tank 20. Thus, when on/off valve 81 is opened to connect tanks 10 and 20 together in RF battery 1L in Embodiment 12, the positive electrode electrolyte containing a large amount of manganese ions in a discharged state can be mixed with the negative electrode electrolyte containing a large amount of titanium ions in a discharged state. Since the electrolytes of both the positive and negative electrodes contain a large amount of ions in a discharged state, self-discharge by the mixing can be reduced. In RF battery 1L in Embodiment 12, therefore, a loss by self-discharge can be suppressed and defects by liquid migration and the like can be corrected.

In the example shown in FIG. 8, tanks 10 and 20 of both the positive and negative electrodes have the same size and the same position of their bottom surfaces. Thus, when there is a difference in the amount of electrolytes, for example, the electrolytes can move under their own weights. In this case, the mixing can be naturally stopped when the amounts of electrolytes of both electrodes become equal to each other, and thus on/off valve 81 may be closed after the electrolytes of both electrodes have been sufficiently mixed together. The amount of mixing can also be adjusted by adjusting the timing of operation of closing on/off valve 81, the positions of the bottom surfaces of tanks 10 and 20 (upper/lower relation), and the like. The amount of mixing can also be adjusted by additionally providing a pump on connection pipe 80.

Although RF battery 1L in Embodiment 12 includes the upstream pipes on the positive electrode side in Embodiment 5 shown in FIG. 3(C), they may be replaced by the upstream pipes on the positive electrode side in Embodiments 1 to 4 described above. Although RF battery 1L in Embodiment 12 includes the upstream pipes on the negative electrode side in Embodiment 11 shown in FIG. 7, they may be replaced by the upstream pipes on the negative electrode side in Embodiments 7 to 10 described above.

Embodiments 13 to 16

Embodiments 13 to 16 are described below. RF batteries in Embodiments 13 to 16 have the above-described basic structure, and are characterized by including the above-described feature (3).

[Electrolytes]

In RF battery 100 in this embodiment, the electrolytes of both the positive and negative electrodes are the same electrolyte containing a Mn ion and a Ti ion. The Mn ion acts as a positive electrode active material on the positive electrode side, while the Ti ion acts as a negative electrode active material on the negative electrode side. For unknown reasons, the Ti ion on the positive electrode side suppresses the deposition of $MnO_2$. Each of the Mn ion and Ti ion preferably has a concentration of not less than 0.3M and not more than 5M.

By using the same electrolyte for the electrolytes of both the positive and negative electrodes as in this embodiment, three effects as described below may be achieved.

(1) A phenomenon in which a battery capacity decreases due to a relative reduction in active material ions essentially reacting on each electrode resulting from movement of the active material ions to a counter electrode through the membrane of the battery element can be effectively prevented.

(2) Even when liquid migration (a phenomenon in which the electrolyte in one electrode moves to the other electrode through the membrane) occurs over time due to charge/discharge to cause variation in the amount of electrolytes of both electrodes and variation in ion concentration, the variations can be readily corrected by mixing the electrolytes of both electrodes.

(3) Manufacturability of the electrolytes is excellent without the need to prepare separate electrolytes dedicated to the positive and negative electrodes, respectively.

As for the solvent of the electrolyte, an aqueous solution of at least one type selected from $H_2SO_4$, $K_2SO_4$, $Na_2SO_4$, $H_3PO_4$, $H_4P_2O_7$, $K_2PO_4$, $Na_3PO_4$, $K_3PO_4$, $HNO_3$, $KNO_3$, and $NaNO_3$ can be utilized.

[Additional Remarks]

Although not illustrated, RF battery 100 may include a monitor cell for monitoring the battery capacity. The monitor cell is basically a single cell smaller than and having the same structure as that of battery element 100c, and generates an electromotive force with the electrolytes of the positive and negative electrodes supplied from positive electrode tank 106 and negative electrode tank 107, as with battery element 100c. The battery capacity of RF battery 100 can be determined from its open circuit voltage.

Embodiment 13

Figure 9:
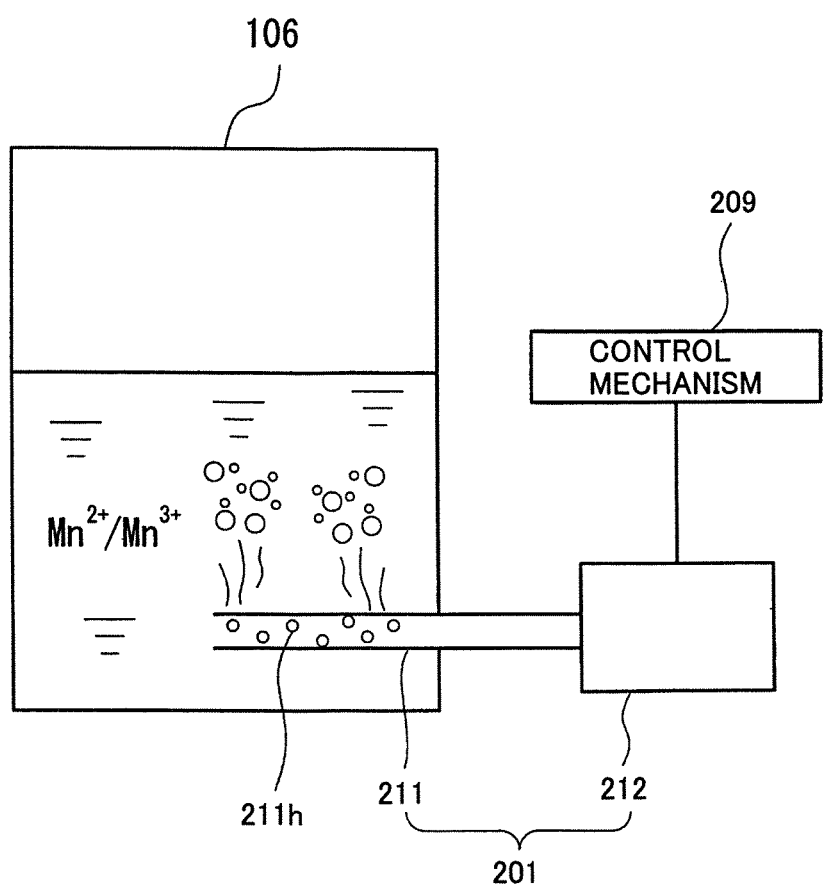
FIG. 9 is a schematic structural diagram of a stirring mechanism described in Embodiment 13 for stirring an electrolyte in a tank by introducing inert gas into the tank.

RF battery 100 shown in FIG. 1 further includes a structure on positive electrode tank 106 and negative electrode tank 107 for stirring the electrolytes stored in tanks 106 and 107. The structure of the stirring mechanism in this embodiment will be described with reference to FIG. 9. FIG. 9 only illustrates positive electrode tank 106 and a stirring mechanism 201 provided on tank 106. Although not specifically illustrated, it can be considered that negative electrode tank 107 (see FIG. 1) is provided with a similar structure.

In this embodiment shown in FIG. 9, stirring mechanism 201 for stirring the electrolyte stored in positive electrode tank 106, and a control mechanism 209 for controlling stirring mechanism 201 are provided.

[Stirring Mechanism]

Stirring mechanism 201 includes an introduction pipe 211 connecting the inside and outside of positive electrode tank 106, and a gas supply mechanism 212 for supplying inert gas into positive electrode tank 106 via introduction pipe 211. In such a structure, introduction pipe 211 is made of PVC, PE, fluorine resin and the like resistant to corrosion by the electrolyte. A portion of introduction pipe 211 in the electrolyte is preferably arranged such that introduction of the inert gas causes convection in the electrolyte in a vertical direction (depth direction) of positive electrode tank 106. A plurality of air holes 211h are formed in a sidewall of introduction pipe 211, to allow the inert gas delivered from gas supply mechanism 212 to be injected through an opening at the end of introduction pipe 211 as well as through air holes 211h. The cross-sectional shape of introduction pipe 211 is not particularly limited, and may be a circular or polygonal shape, for example.

Gas supply mechanism 212 typically includes a gas cylinder storing the inert gas, and a pump for transferring the inert gas from the gas cylinder to introduction pipe 211 by pressure. The inert gas may be helium, argon, nitrogen, for example.

[Control Mechanism]

Control mechanism 209 controls supply mechanism 212 of stirring mechanism 201 to adjust an amount of the inert gas blown into positive electrode tank 106, and can be implemented as a computer, for example. A computer controlling the operation of charge and discharge of RF battery 100 may double as control mechanism 209. Control mechanism 209 is connected to and controls the stirring mechanism of the negative electrode tank.

Control mechanism 209 may be configured to control the operation of stirring mechanism 201 according to a predetermined schedule. In this case, an operation schedule of stirring mechanism 201 is preferably determined in accordance with a charge and discharge schedule of RF battery 100. If the charge and discharge schedule is such that the battery is charged during a specific period at night and discharged during a specific period of high demand for electricity in the daytime, for example, stirring mechanism 201 may be controlled according to an operation schedule in which the operation of stirring mechanism 201 is started slightly before the start of charge (discharge), and the operation of stirring mechanism 201 is stopped upon completion of the charge (discharge). Alternatively, as will be illustrated in Embodiment 15 to be described later, a state of the electrolyte in positive electrode tank 106 may be detected to control stirring mechanism 201 based on the detection result.

According to the structure in Embodiment 13 described above, the concentrations of the active material ions in the electrolytes (the Mn ion in positive electrode tank 106, the Ti ion in negative electrode tank 107) can be uniformed during charge and discharge of RF battery 100. As a result, RF battery 100 can be operated in a sound state.

Embodiment 14

Figure 10:
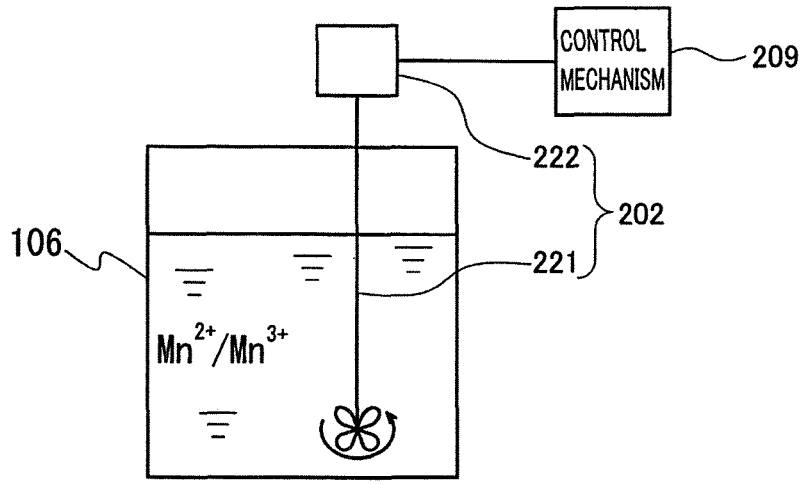
FIGS. 10(A) to (C) are schematic structural diagrams of stirring mechanisms described in Embodiment 14 for stirring an electrolyte in a tank by causing convection in the electrolyte.
Figure 10:
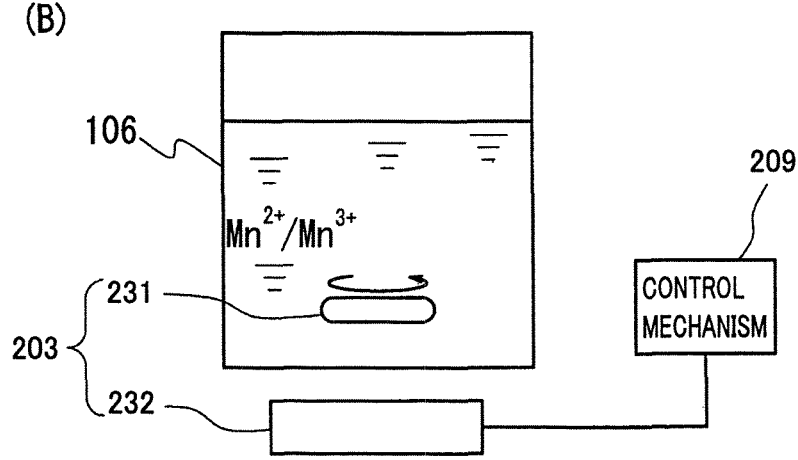
Figure 10:
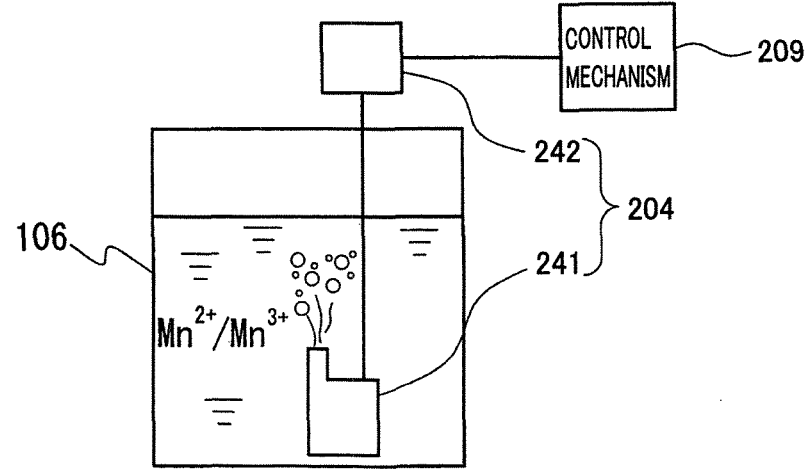

In Embodiment 14, unlike Embodiment 13, RF battery 100 including a stirring mechanism that stirs the electrolyte by causing convection in the electrolyte in a vertical direction of positive electrode tank 106 is described with reference to FIG. 10.

First, a stirring mechanism 202 shown in FIG. 10(A) includes a stirring member 221 having a propeller at the tip of a rotation shaft, and a motor 222 for axially rotating the rotation shaft. With this structure, extremely strong convection can be generated in the electrolyte in positive electrode tank 106, to stir the electrolyte quickly and effectively.

Next, a stirring mechanism 203 shown in FIG. 10(B) has a structure similar to the so-called magnetic stirrer. Specifically, stirring mechanism 203 includes a stirrer bar (stirring member) 231, and a stirrer body 232 for generating an electromagnetic force that rotates stirrer bar 231. With this structure, stirrer bar 231 can be operated without forming a hole in positive electrode tank 106. A magnet having a coating of Teflon® or the like on the periphery may be used as stirrer bar 231. The shape of stirrer bar 231 is not particularly limited, and may be the common shape of a cocoon, the shape of an octagonal rod, or the shape of vanes of a windmill, for example. A magnetic stirrer stirring the electrolyte by vibration instead of rotation may be used.

Lastly, a stirring mechanism 204 shown in FIG. 10(C) includes a submersible pump (stirring member) 241 immersed in the electrolyte in positive electrode tank 106, and a power supply device 242 for supplying electric power to submersible pump 241 to operate submersible pump 241. With this structure, convention stronger than those in the structures of FIGS. 10(A) and (B) can be generated.

Embodiment 15

Figure 11:
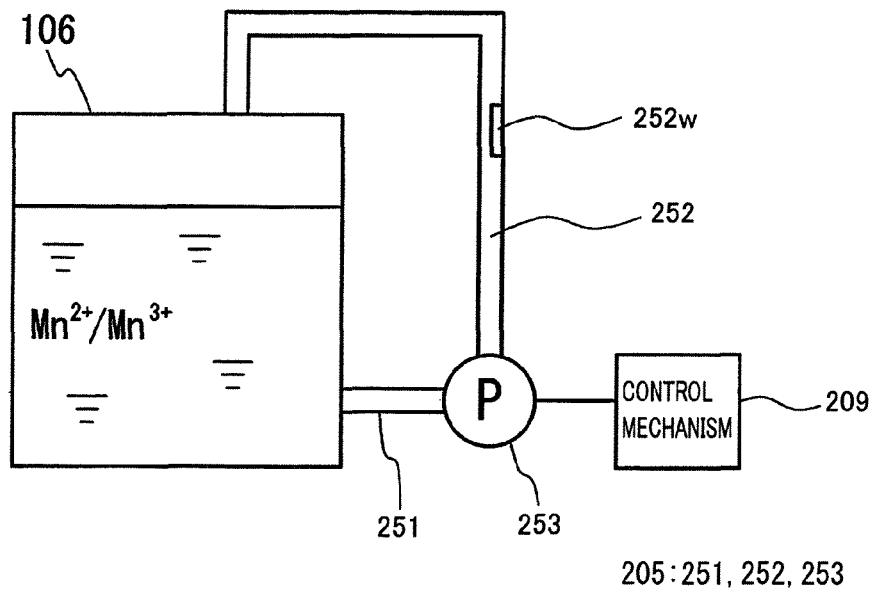
FIGS. 11(A) to (B) are schematic structural diagrams of stirring mechanisms described in Embodiment 15 for stirring an electrolyte in a tank by temporarily removing the electrolyte to the outside and returning it to the tank again.
Figure 11:
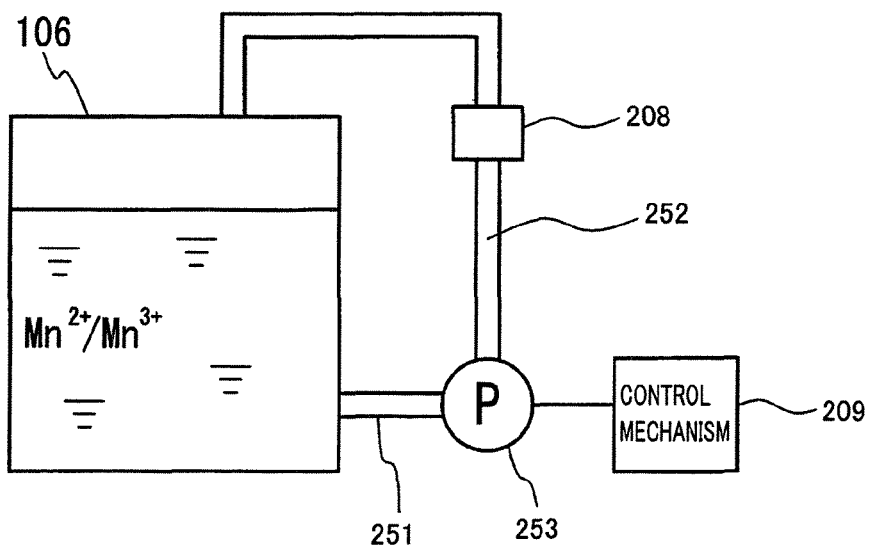

In Embodiment 15, unlike Embodiments 13 and 14, RF battery 100 including a stirring mechanism 205 that stirs the electrolyte by temporarily removing the electrolyte to the outside of positive electrode tank 106 and returning it to positive electrode tank 106 again will be described with reference to FIG. 11.

As shown in FIGS. 11(A) and (B), stirring mechanism 205 includes a go pipe (stirring pipe) 251, a return pipe (stirring pipe) 252, and a liquid delivery pump 253. Go pipe 251 opens to a liquid phase in positive electrode tank 106, and return pipe 252 opens to a gas phase (or the liquid phase) of positive electrode tank 106. Pump 253 is provided between pipes 251 and 252, and delivers the electrolyte from within positive electrode tank 106 to return pipe 252 via go pipe 251. In addition to the above-described structure, FIG. 11(A) includes a structure for observing the distribution of Mn ions in the electrolyte in positive electrode tank 106, and FIG. 11(B) includes a structure for regulating the temperature of the electrolyte, which will be described later.

Stirring mechanism 205 having the above-described structure can create a flow of the electrolyte from positive electrode tank 106→go pipe 251→return pipe 252→positive electrode tank 106, thus effectively stirring the electrolyte.

[Structure for Observing Distribution of Mn Ions]

Since the Mn ions in the electrolyte in positive electrode tank 106 are not always mal-distributed, it is inefficient to operate the above-described structure at all times. It is thus preferable to detect the maldistribution, and to operate stirring mechanism 205 by determining the necessity to stir the electrolyte based on the detection result. In the structure shown in FIG. 11(A), for example, as a structure for detecting the maldistribution, return pipe 252 (or go pipe 251) is provided with a transparent window portion 252w through which the degree of transparency of the electrolyte can be observed.

A solution of $Mn^{3+}$ is colored, and a solution of $Mn^{2+}$ is substantially colorless and transparent. The degree of transparency of an electrolyte is reduced when $Mn^{3+}$ becomes dominant in the electrolyte. Conversely, the degree of transparency of the electrolyte is increased when $Mn^{2+}$ becomes dominant. Namely, if the degree of transparency of the electrolyte that can be observed through window portion 252w is low even when RF battery 100 has been discharged and $Mn^{2+}$ should now be dominant in positive electrode tank 106, it can be determined that maldistribution has occurred in the distribution of Mn ions in the electrolyte in positive electrode tank 106. In negative electrode tank 107 (see FIG. 1), too, the necessity to stir the electrolyte can be determined based on the degree of transparency of the electrolyte by using a structure similar to that of FIG. 11(A). This is because the degree of transparency of the electrolyte is reduced when $Ti^{3+}$ becomes dominant in the electrolyte, and the degree of transparency of the electrolyte is increased when $Ti^{4+}$ becomes dominant.

The degree of transparency of the electrolyte can be virtually observed, or can be automatically observed by an optical sensor, for example. In the former case, the degree of transparency of the electrolyte may be visually observed, and an operator may operate control mechanism 209 to adjust an output from pump 253. In the latter case, control mechanism 209 may automatically adjust an output from pump 253 based on a detection result from the optical sensor.

The structure for detecting the maldistribution of Mn ions in the electrolyte by using window portion 252w is not limited to return pipe 252 and go pipe 251. For example, a window portion may be formed at a position close to the bottom of positive electrode tank 106, or a window portion may be formed at a position close to the liquid level of the electrolyte in positive electrode tank 106, or a window portion may be formed at both positions. A window portion provided on positive electrode tank 106 is also applicable to the structures of Embodiments 13 and 14.

Instead of referring to the degree of transparency of the electrolyte, the electrolyte may be removed from positive electrode tank 106 to detect the maldistribution of Mn ions in the electrolyte. For example, the electrolyte may be removed from the position close to the bottom and the position close to the liquid level of positive electrode tank 106 to separate containers, and if the difference in potential between those electrolytes exceeds a threshold value, it can be determined that the electrolyte needs to be stirred.

[Structure for Regulating Temperature of Electrolyte]

In FIG. 11(B), return pipe 252 (or go pipe 251) is provided with a temperature regulation mechanism 208, for example, a heat changer, for regulating the temperature of the electrolyte. With this structure, the temperature of the electrolyte can be regulated simultaneously with stirring of the electrolyte. Since the operation of stirring the electrolyte is performed before charge and discharge of RF battery 100 in the structure of the present invention in the first place, it is efficient to regulate the temperature of the electrolyte during that time.

[Additional Remarks]

Stirring pipes 251 and 252 may each be provided with a filter for removing impurities and depositions in the electrolyte. By providing the filter, a load on liquid delivery pump 253 can be reduced. As a material for the filter, a plastic (such as PVC, PE, fluorine resin) mesh resistant to corrosion by the electrolyte, a carbon mesh or the like may be used. The filter preferably has a pore diameter of 0.1 to 100 μm.

Embodiment 16

Figure 12:
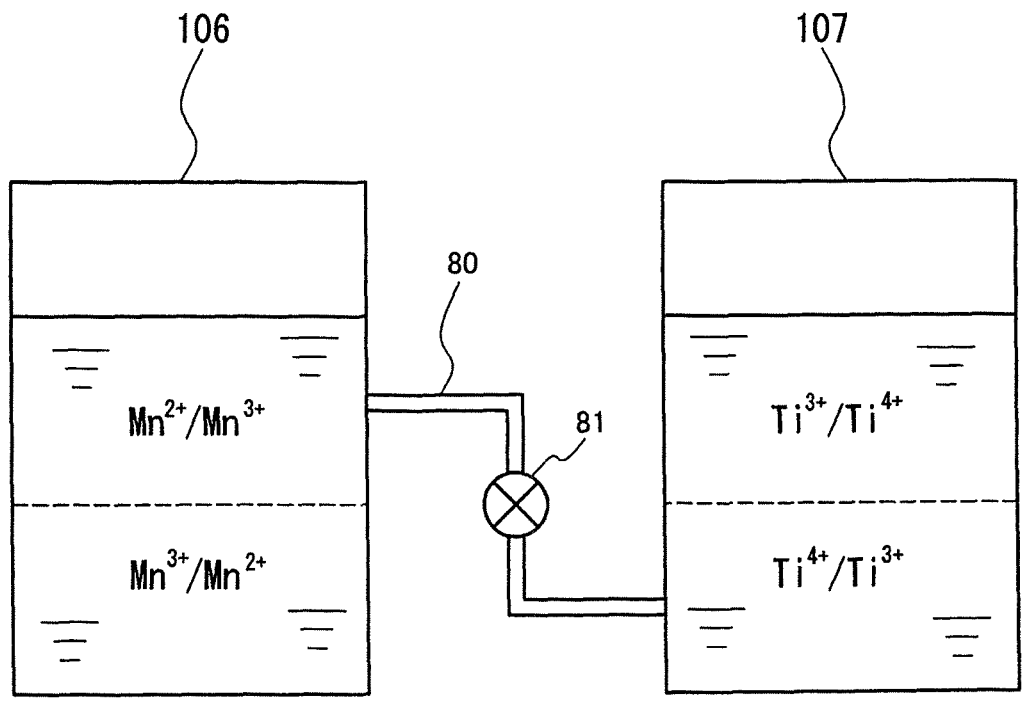
FIG. 12 is a schematic structural diagram illustrating how a connection pipe connecting a liquid phase in a positive electrode tank to a liquid phase in a negative electrode tank described in Embodiment 16 is arranged.

In Embodiment 16, RF battery 100 including connection pipe 80 connecting the liquid phase in positive electrode tank 106 to the liquid phase in negative electrode tank 107 in addition to the structures of Embodiments 13 to 15 will be described with reference to FIG. 12. FIG. 12 is a simple drawing illustrating only a state of connection between connection pipe 80 and positive electrode tank 106, negative electrode tank 107.

[Connection Pipe]

Connection pipe 80 connects the liquid phase in positive electrode tank 106 to the liquid phase in negative electrode tank 107. More specifically, one end of connection pipe 80 on the negative electrode tank 107 side opens to a position close to the bottom of negative electrode tank 107, and the other end of connection pipe 80 on the positive electrode tank 106 side opens to a position close to the liquid level of the electrolyte in positive electrode tank 106, which is higher than the opening position of the one end. By providing connection pipe 80, the electrolytes in both tanks 106 and 107 can be mixed together. On/off valve 81 is provided in a portion of connection pipe 80, to allow switching between the connection and disconnection between positive electrode tank 106 and negative electrode tank 107 as required.

Connection pipe 80 is provided to restore the battery capacity of RF battery 100. By opening connection pipe 80, the electrolytes of the positive and negative electrodes are mixed to quickly discharge RF batter 100. As was already described, $Mn^{2+}$ in an oxidation state during discharge exists disproportionately on the upper side in positive electrode tank 106, while $Ti^{4+}$ in an oxidation state during discharge exists disproportionately on the lower side in negative electrode tank 107. With connection pipe 80 connecting the upper portion of positive electrode tank 106 to the lower portion of negative electrode tank 107, therefore, RF battery 100 can be discharged more efficiently and reliably than with a connection pipe merely horizontally connecting tanks 106 and 107 together. If the stirring mechanism is operated after a lapse of a prescribed period of time since the opening of connection pipe 80, RF battery 100 can be discharged more reliably.

Embodiments 17 to 20

RF batteries in Embodiments 17 to 20 have the above-described basic structure, and are characterized by containing the same metal ion species in the electrolytes of both the positive and negative electrodes, and by including a connection pipe connected between the tanks storing the electrolytes of both the positive and negative electrodes. The RF batteries may include the above-described features (1) to (3) in these embodiments.

Embodiment 17

Figure 13:
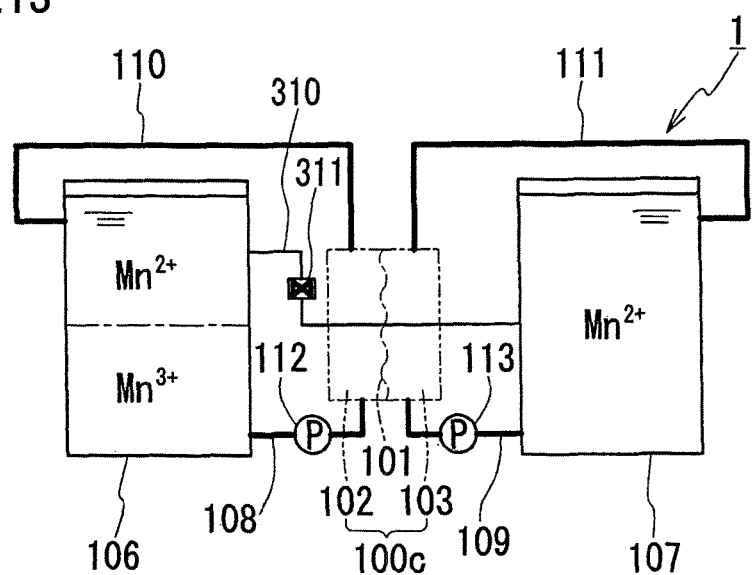
FIG. 13 is a schematic structural diagram of a redox flow battery according to Embodiment 17.

Referring to FIG. 13, an RF battery 1 in Embodiment 17 is described. RF battery 1 in Embodiment 17 has the above-described basic structure, and is characterized by containing a manganese ion in the electrolytes of both the positive and negative electrodes, and by including a connection pipe 310 connecting tanks 106 and 107 of both electrodes together. These characteristic points will be mainly described below.

[Electrolytes]

The electrolytes of both the positive and negative electrodes contain a manganese ion as the same metal ion species. In the positive electrode, the manganese ion acts as a positive electrode active material.

The positive electrode electrolyte contains at least one species of manganese ion selected from a divalent manganese ion ($Mn^{2+}$) and a trivalent manganese ion ($Mn^{3+}$). As described above, a study by the present inventors found that $MnO_2$ can also be utilized as an active material. Accordingly, the present invention allows inclusion of tetravalent manganese ($MnO_2$). The matters regarding the manganese ion in the positive electrode are likewise applicable to Embodiment 19 to be described later.

The negative electrode electrolyte contains, for example, as a negative electrode active material, at least one species of metal ion selected from a titanium ion, a vanadium ion, a chromium ion, a zinc ion, and a tin ion. A manganese-titanium-based RF battery and a manganese-tin-based RF battery containing a titanium ion and a tin ion can have an electromotive force of about 1.4V, a manganese-vanadium-based RF battery containing a vanadium ion can have an electromotive force of about 1.8V, a manganese-chromium-based RF battery containing a chromium ion can have an electromotive force of about 1.9V, and a manganese-zinc-based RF battery containing a zinc ion can have a higher electromotive force of about 2.2V. FIG. 13 illustrates a manganese ion (valence being illustrative) in negative electrode tank 107.

The positive electrode electrolyte further contains a metal ion of the same species as the metal ion species contained in the negative electrode electrolyte as a negative electrode active material, and the negative electrode electrolyte further contains a manganese ion in addition to the metal ion acting as the negative electrode active material. The metal ion in the positive electrode electrolyte of the same species as the negative electrode active material, and the manganese ion in the negative electrode electrolyte are contained mainly to attain the same composition in the electrolytes of both the positive and negative electrodes. The metal ions contained for attaining the same composition can also be utilized as active materials in the positive and negative electrodes (this point is applicable to the embodiments to be described later).

The electrolytes of both the positive and negative electrodes can contain any metal ions as long as they do not react with each other and can be completely mixed together. Typically, all of metal ion species contained in the electrolytes of both electrodes overlap each other, namely, the metal ion species in the electrolytes of both electrodes are completely identical to each other. In such an embodiment, a phenomenon in which a battery capacity decreases due to a relative reduction in metal ions essentially reacting on each electrode (metal ions acting as an active material) resulting from movement of the metal ions of the positive and negative electrodes to a counter electrode can be effectively prevented. Moreover, in this embodiment, manufacturability of the electrolytes is excellent. The metal ion species contained in the electrolytes of both electrodes may only partially overlap each other. For example, for an RF battery at an early stage of installation, metal ion species contained in the electrolytes of both electrodes and only partially overlapping each other may be prepared, and all metal ion species may overlap each other in the RF battery after the mixing operation. The above-described matters (the number of overlapping ions, the timing of overlap) are likewise applicable to embodiments to be described later.

In the electrolyte of each of the positive and negative electrodes, the metal ion (which includes any of metal ions contained as an active material, and metal ions contained to attain the same composition) preferably has a concentration of not less than 0.3M and not more than 5M (M: molarity). As for the solvent of the electrolyte in each electrode, it is preferable to use an aqueous solution containing at least one of sulfuric acid, phosphoric acid, nitric acid, sulfate, phosphate, and nitrate. Particularly, an aqueous solution containing sulfate anion ($SO_4^{2-}$) can be readily utilized. The acid preferably has a concentration of less than 5M. The above-described matters (ion concentration, solvent) are likewise applicable to embodiments to be described later.

[Connection Pipe]

Connection pipe 310 connecting positive electrode tank 106 and negative electrode tank 107 together opens to the electrolytes (liquid phases) stored in tanks 106 and 107, respectively, with different opening positions to tanks 106 and 107.

Figure 14:
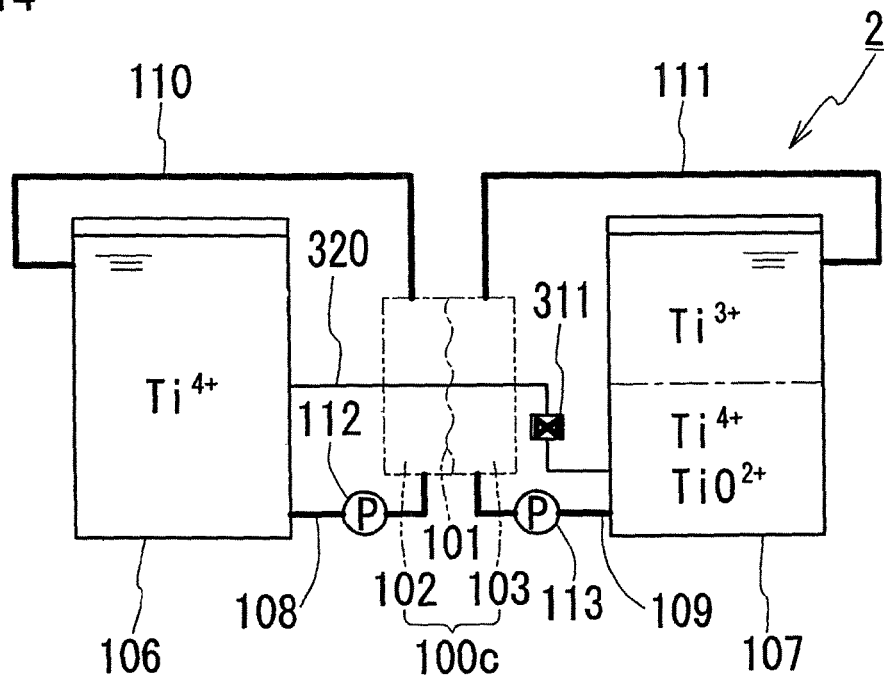
FIG. 14 is a schematic structural diagram of a redox flow battery according to Embodiment 18.
Figure 15:
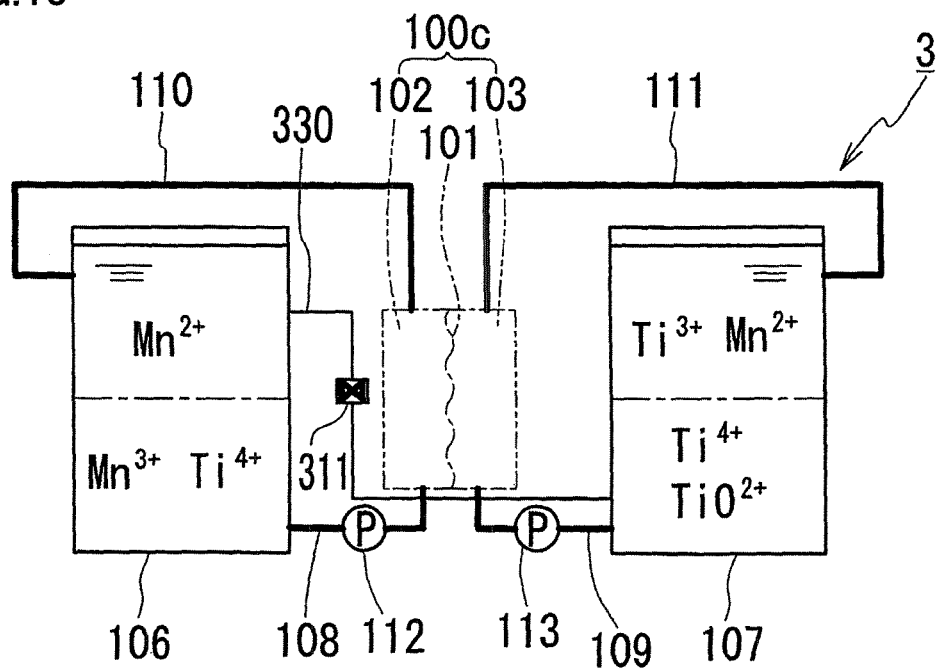
FIG. 15 is a schematic structural diagram of a redox flow battery according to Embodiment 19.

Connection pipe 310 has one end connected to positive electrode tank 106 at a position close to a liquid level of the positive electrode electrolyte in tank 106. More specifically, when the height of the liquid level from a bottom surface of positive electrode tank 106 is represented as Lp, the one end of connection pipe 310 opens to a position higher than (Lp/2) from the bottom surface. This opening position of the one end of connection pipe 310 is preferably closer to the liquid level in positive electrode tank 106, and more preferably a position equal to or higher than (⅔)×Lp, and a position equal to or higher than (¾)×Lp from the bottom surface. In FIGS. 13 to 15, a solid line in positive electrode tank 106 indicates the liquid level, and in FIGS. 13 and 15, a chain-dotted line in positive electrode tank 106 indicates the position of (Lp/2) from the bottom surface.

Connection pipe 310 has the other end connected to negative electrode tank 107 at an arbitrary position relative to the liquid phase in tank 107. More specifically, when the height of the liquid level from a bottom surface of negative electrode tank 107 is represented as La, the other end of connection pipe 310 opens to a position lower than La from the bottom surface. FIG. 13 illustrates the position of (La/2) from the bottom surface.

In RF battery 1, connection pipe 310 is provided with an on/off valve 311 to allow switching between the connection and disconnection between positive electrode tank 106 and negative electrode tank 107 when desired. An electromagnetic valve or the like may be used as on/off valve 311.

[Operation Method]

As with a conventional RF battery, RF battery 1 having the above-described structure can be charged and discharged by supplying the positive electrode electrolyte containing a manganese ion and the negative electrode electrolyte containing a metal ion acting as a negative electrode active material to battery element 100c by circulation with pipes 108 to 111 and pumps 112, 113. The operation of charge and discharge is similarly performed in embodiments to be described later.

If liquid migration over time and the like causes variation in the amount of electrolytes of both the positive and negative electrodes (difference in liquid level) and variation in concentration of the metal ions in the electrolytes of both electrodes, the variations can be corrected by mixing the electrolytes of both the positive and negative electrodes via connection pipe 310.

In RF battery 1, the electrolytes of both the positive and negative electrodes can be mixed together by opening on/off valve 311. Particularly, in RF battery 1, charged manganese ions ($Mn^{3+}$) tend to be collected on the bottom side of positive electrode tank 106 due to their specific gravity, while non-charged (discharged state) manganese ions ($Mn^{2+}$) tend to be collected on the liquid level side of tank 106. By opening on/off valve 311, therefore, the positive electrode electrolyte containing a relatively large amount of manganese ions in a discharged state and the negative electrode electrolyte in negative electrode tank 107 can be mixed together. On/off valve 311 may be closed after the electrolytes of both electrodes have been sufficiently mixed.

In this example, tanks 106 and 107 of both the positive and negative electrodes have the same size and the same position of their bottom surfaces. Thus, the electrolytes of both electrodes move to tanks 106 and 107 under their own weights and are mixed together, and the mixing can be naturally stopped when the amounts of electrolytes of both electrodes become equal to each other. As such, the mixing can be readily performed by opening/closing on/off valve 311, thereby attaining excellent workability. The amount of mixing can also be adjusted by adjusting the timing of closing on/off valve 311, the positions of the bottom surfaces of tanks 106 and 107 (upper/lower relation), and the like. The amount of mixing can also be adjusted by additionally providing a pump on connection pipe 310. The above-described matters (the size of the tanks, the arrangement position, the provision of the pump) are likewise applicable to embodiments to be described later.

[Effects]

RF battery 1 in Embodiment 17 contains a manganese ion in the electrolytes of both the positive and negative electrodes, with the manganese ion acting as a positive electrode active material in the positive electrode, thereby obtaining a higher electromotive force than a conventional all-vanadium RF battery. Particularly, in RF battery 1, when mixing the electrolytes of both electrodes together, since the opening position of connection pipe 310 on the positive electrode side is close to the liquid level of the positive electrode electrolyte in positive electrode tank 106, the positive electrode electrolyte containing a large amount of manganese ions in a discharged state collected on the liquid level side and the negative electrode electrolyte in negative electrode tank 107 can be mixed together. In RF battery 1, therefore, self-discharge by the mixing of the electrolytes of both electrodes hardly occurs, or substantially does not occur, thereby reducing a loss by the self-discharge. Moreover, in RF battery 1 where the positive electrode electrolyte containing a large amount of manganese ions in a discharged state can be mixed, the low loss by the self-discharge allows the operation of mixing the electrolytes to be performed regardless of the charged state of the positive electrode electrolyte. In this manner, as with a conventional all-vanadium RF battery, RF battery 1 can readily correct variation in the amount of electrolytes due to liquid migration and the like by mixing the electrolytes together, have a low loss, and have a high electromotive force over a long time.

Moreover, in RF battery 1 in Embodiment 17 where connection pipe 310 is provided with on/off valve 311, on/off valve 311 can be closed during normal time. Namely, in RF battery 1, the electrolytes of both the positive and negative electrodes are not mixed during normal time, thus not causing self-discharge by the mixing. As such, a loss by the self-discharge resulting from the mixing of electrolytes can be more readily suppressed in RF battery 1.

Embodiment 18

Referring to FIG. 14, an RF battery 2 in Embodiment 18 is described. RF battery 2 in Embodiment 18 has the above-described basic structure, and is characterized by containing a titanium ion in the electrolytes of both the positive and negative electrodes, and by including a connection pipe 320 connecting tanks 106 and 107 of both electrodes together. These characteristic points will be mainly described below.

[Electrolytes]

The electrolytes of both the positive and negative electrodes contain a titanium ion as the same metal ion species. In the negative electrode, the titanium ion acts as a negative electrode active material.

The negative electrode electrolyte contains at least one species of titanium ion selected from a trivalent titanium ion ($Ti^{3+}$) and a tetravalent titanium ion (such as $Ti^{4+}$, $TiO^{2+}$). The negative electrode electrolyte may contain a divalent titanium ion. The matters regarding the titanium ion in the negative electrode is likewise applicable to Embodiment 19 to be described later.

As for the positive electrode electrolyte, for example, the manganese ions as described above can be suitably used as a positive electrode active material. Additionally, the positive electrode electrolyte contains, for example, an iron ion, a vanadium ion, a titanium ion as a positive electrode active material. FIG. 14 illustrates a titanium ion (valence being illustrative) in positive electrode tank 106.

[Connection Pipe]

Connection pipe 320 connecting positive electrode tank 106 and negative electrode tank 107 together opens to the electrolytes (liquid phases) stored in tanks 106 and 107, as with connection pipe 310 in Embodiment 17, with on/off valve 311 being provided on a portion of connection pipe 320. Connection pipe 320 also has different opening positions to tanks 106 and 107.

Connection pipe 320 has one end connected to negative electrode tank 107 at a position close to the bottom of tank 107. More specifically, when the height of the liquid level from a bottom surface of negative electrode tank 107 is represented as La, the one end of connection pipe 320 opens to a position equal to or lower than (La/2) from the bottom surface. This opening position of the one end of connection pipe 320 is preferably closer to the bottom of tank 107, and more preferably a position equal to or lower than (⅓)×La, and a position equal to or lower than (¼)×La from the bottom surface. In FIG. 14, a chain-dotted line in negative electrode tank 107 indicates the position of (La/2) from the bottom surface.

Connection pipe 320 has the other end connected to positive electrode tank 106, which opens to an arbitrary position relative to the liquid phase in tank 106, namely, a position lower than Lp from the bottom surface. FIG. 14 illustrates the position of (Lp/2) from the bottom surface.

[Operation Method]

In RF battery 2 having the above-described structure, too, variation in the amount of electrolytes, variation in ion concentration and the like can be corrected by mixing the electrolytes of both positive and negative electrodes together via connection pipe 320.

Specifically, as with RF battery 1 in Embodiment 17, in RF battery 2 in Embodiment 18, the electrolytes of both the positive and negative electrodes can be mixed together by opening on/off valve 311. Particularly, in RF battery 2, charged titanium ions ($Ti^{3+}$) tend to be collected on the liquid level side of the negative electrode electrolyte in negative electrode tank 107 due to their specific gravity, while non-charged (discharged state) titanium ions (such as $Ti^{4+}$) tend to be collected on the bottom side of tank 107. By opening on/off valve 311, therefore, the negative electrode electrolyte containing a relatively large amount of titanium ions in a discharged state and the positive electrode electrolyte in positive electrode tank 106 can be mixed together. On/off valve 311 may be closed after the electrolytes of both electrodes have been sufficiently mixed.

[Effects]

RF battery 2 in Embodiment 18 contains a titanium ion in the electrolytes of both the positive and negative electrodes, with the titanium ion acting as a negative electrode active material in the negative electrode, thereby obtaining an electromotive force substantially equal to that of a conventional all-vanadium RF battery. Particularly, in RF battery 2, when mixing the electrolytes of both electrodes together, since the opening position of connection pipe 320 on the negative electrode side is close to the bottom of negative electrode tank 107, the negative electrode electrolyte containing a large amount of titanium ions in a discharged state collected on the bottom side and the positive electrode electrolyte in positive electrode tank 106 can be mixed together. In RF battery 2, therefore, self-discharge by the mixing of the electrolytes of both electrodes hardly occurs, or substantially does not occur, thereby reducing a loss by the self-discharge. Moreover, in RF battery 2 where the negative electrode electrolyte containing a large amount of titanium ions in a discharged state can be mixed, the low loss by the self-discharge allows the operation of mixing the electrolytes to be performed regardless of the charged state of the negative electrode electrolyte. In this manner, as with a conventional all-vanadium RF battery, RF battery 2 can readily correct variation in the amount of electrolytes due to liquid migration and the like by mixing the electrolytes together, have a low loss, and have a high electromotive force over a long time.

Moreover, in RF battery 2 in Embodiment 18 where connection pipe 320 is provided with on/off valve 311, as with RF battery in Embodiment 17, the electrolytes of both the positive and negative electrodes are not mixed during normal time. As such, a loss by the self-discharge resulting from the mixing of electrolytes can be readily suppressed.

Embodiment 19

Referring to FIG. 15, an RF battery 3 in Embodiment 19 is described. RF battery 3 in Embodiment 19 has the above-described basic structure, and is characterized by containing a manganese ion and a titanium ion in the electrolytes of both the positive and negative electrodes, and by including a connection pipe 330 connecting tanks 106 and 107 of both electrodes together. These characteristic points will be mainly described below.

[Electrolytes]

In RF battery 3 containing both a manganese ion and a titanium ion in the electrolytes of both the positive and negative electrodes, the manganese ion in the positive electrode electrolyte is utilized as a positive electrode active material. The titanium ion in the positive electrode electrolyte is contained to attain the same metal ion species, and also acts as a deposition suppressing agent suppressing the deposition of $MnO_2$ by disproportionation reaction of $Mn^{3+}$. In RF battery 3, the titanium ion in the negative electrode electrolyte is utilized as a negative electrode active material, and the manganese ion in the negative electrode electrolyte is contained to attain the same metal ion species.

[Connection Pipe]

Connection pipe 330 provided in RF battery 3 has one end connected to positive electrode tank 106 at a position close to a liquid level of the positive electrode electrolyte (position higher than (Lp/2)) in tank 106, and the other end connected to negative electrode tank 107 at a position close to the bottom (position equal to or lower than (La/2)) of negative electrode tank 107. As was described in Embodiments 17 and 18, the one end of connection pipe 330 connected to positive electrode tank 106 is preferably closer to the liquid level in positive electrode tank 106, and more preferably a position equal to or higher than (⅔)×Lp, and a position equal to or higher than (¾)×Lp from the bottom surface. The other end of connection pipe 330 connected to negative electrode tank 107 is preferably closer to the bottom of negative electrode tank 107, and more preferably a position equal to or lower than (⅓)×La, and a position equal to or lower than (¼)×La from the bottom surface. In this example, the other end of connection pipe 330 connected to negative electrode tank 107 is at a position lower than the one end connected to positive electrode tank 106. In this example, too, connection pipe 330 is provided with an on/off valve 311.

[Operation Method]

In RF battery 3 having the above-described structure, too, variation in the amount of electrolytes, variation in ion concentration and the like can be corrected by mixing the electrolytes of both positive and negative electrodes together via connection pipe 330.

Specifically, as with RF batteries 1 and 2 in Embodiments 17 and 18, in RF battery 3 in Embodiment 19, the electrolytes of both the positive and negative electrodes can be mixed together by opening on/off valve 311. Particularly, in RF battery 3, the positive electrode electrolyte containing a relatively large amount of manganese ions in a discharged state and the negative electrode electrolyte containing a relatively large amount of titanium ions in a discharged state can be mixed together by opening on/off valve 311. On/off valve 311 may be closed after the electrolytes of both electrodes have been sufficiently mixed.

[Effects]

RF battery 3 in Embodiment 19 contains a manganese ion and a titanium ion in the electrolytes of both the positive and negative electrodes, with the manganese ion acting as a positive electrode active material in the positive electrode and the titanium ion acting as a negative electrode active material in the negative electrode, thereby obtaining a higher electromotive force than a conventional all-vanadium RF battery. Particularly, in RF battery 3 containing a titanium ion in the positive electrode electrolyte, the deposition of $MnO_2$ can be suppressed to stabilize $Mn^{3+}$, thereby obtaining a high electromotive force over a long time.

Particularly, in RF battery 3, when mixing the electrolytes of both the positive and negative electrodes together, since the opening position of the one end of connection pipe 330 is close to the liquid level of the positive electrode electrolyte in positive electrode tank 106 and the opening position of the other end is close to the bottom of negative electrode tank 107, the positive electrode electrolyte containing a large amount of manganese ions in a discharged state and the negative electrode electrolyte containing a large amount of titanium ions in a discharged state can be mixed together. In RF battery 3, therefore, self-discharge by the mixing of the electrolytes of both the positive and negative electrodes hardly occurs, or substantially does not occur, thereby reducing a loss by the self-discharge. Moreover, in RF battery 3 where the electrolyte in a discharged state can be mixed in both the positive and negative electrodes, the low loss by the self-discharge allows the operation of mixing the electrolytes to be performed regardless of the charged states of the electrolytes of both electrodes. In this manner, as with a conventional all-vanadium RF battery, RF battery 3 can readily correct variation in the amount of electrolytes due to liquid migration and the like by mixing the electrolytes together, have a low loss, and have a high electromotive force over a long time.

Moreover, in RF battery 3 in Embodiment 19 where connection pipe 330 is provided with on/off valve 311, as with RF batteries 1 and 2 in Embodiments 17 and 18, a mixing time of the electrolytes of both the positive and negative electrodes (a time during which on/off valve 311 is opened) can be readily controlled to any length of time. As such, a loss by the self-discharge resulting from the mixing of electrolytes can be readily reduced in RF battery 3 as well.

Embodiment 20

In Embodiments 17 to 19, connection pipes 310, 320 and 330 were described as being provided with on/off valve 311. Alternatively, the on/off valve may be removed. In such an embodiment, the liquid phase in positive electrode tank 106 and the liquid phase in negative electrode tank 107 are connected together at all times. In this case, however, a loss by the self-discharge can also be reduced by setting at least a portion of the connection pipe to a specific size.

In this embodiment, depending on the specifications of the RF battery (such as the size of battery element 100c and the battery capacity), it is preferable to utilize a connection pipe including a small diameter portion having an inner diameter φ of not more than 25 mm. If the small diameter portion is too small, it is difficult to sufficiently mix the electrolytes of both the positive and negative electrodes together. The inner diameter φ of the small diameter portion is thus preferably not less than 13 mm, and approximately not less than 13 mm and not more than 25 mm for easy use. The above-described effects can be obtained if the connection pipe has a uniform inner diameter φ of not more than 25 mm along the entire length, namely, if the entire connection pipe is the small diameter portion, or if a longitudinal portion (preferably having a length of not less than 10 cm) of the connection pipe has a small diameter portion having an inner diameter φ of not more than 25 mm. The above-described effects can be obtained if the small diameter portion is included.

In the RF battery in Embodiment 20, the tanks of both the positive and negative electrodes are connected together at all times by the connection pipe. Therefore, variation in the amount of electrolytes (occurrence of a difference in liquid level) and variation in ion concentration substantially do not occur over time. Furthermore, in the RF battery in Embodiment 20 where an on/off valve is not provided, opening/closing operation need not be performed when mixing the electrolytes. As such, additional operation for mixing the electrolytes of both electrodes is not required in the RF battery in Embodiment 20.

The present invention is not limited to the above-described embodiments but can be modified as appropriate without deviation from the gist of the present invention. For example, the metal ions contained in the positive electrode electrolyte and negative electrode electrolyte can be changed.

INDUSTRIAL APPLICABILITY

The redox flow battery according to the present invention can be suitably used as a large-capacity storage battery for stabilizing variations in power generation output, storing surplus generated power, and load leveling for power generation of new energy such as solar photovoltaic power generation and wind power generation. The redox flow battery according to the present invention can also be suitably used as a large-capacity storage battery attached to a common power plant or factory for momentary voltage drop and power failure prevention and for load leveling.

REFERENCE SIGNS LIST 1A, 1B, 1C, 1D, 1E, 1F, 1G, 1H, 1I, 1J, 1K, 1L, 1, 2, 3, 100 redox flow battery; 100c battery element; 101 membrane; 102 positive electrode cell; 103 negative electrode cell; 104 positive electrode; 105 negative electrode; 108, 109, 110, 111 pipe; 112, 113 pump; 10, 106 positive electrode tank; 11c positive electrode charging pipe; 11d positive electrode discharging pipe; 12 positive electrode common pipe; 13 positive electrode return pipe; 14 positive electrode common return pipe; 15c positive electrode charging return pipe; 15d positive electrode discharging return pipe; 50, 50c, 50d positive electrode pump; 51c, 51d on/off valve; 52, 55 three-way valve; 53c, 53d check valve; 20, 107 negative electrode tank; 21 negative electrode supply pipe; 21c negative electrode charging pipe; 21d negative electrode discharging pipe; 22 negative electrode common pipe; 23 negative electrode return pipe; 24 negative electrode common return pipe; 25c negative electrode charging return pipe; 25d negative electrode discharging return pipe; 60, 60c, 60d negative electrode pump; 61c, 61d, 81, 311 on/off valve; 62, 65 three-way valve; 63c, 63d check valve; 201, 202, 203, 204, 205 stirring mechanism; 208 temperature regulation mechanism; 209 control mechanism; 211 introduction pipe; 211h air hole; 212 gas supply mechanism; 221 rotation shaft (stirring member); 222 motor; 231 stirrer bar (stirring member); 232 stirrer body; 241 submersible pump (stirring member); 242 power supply device; 251, 252 stirring pipe; 253 liquid delivery pump; 252w window portion; 80, 310, 320, 330 connection pipe.

The invention claimed is:

1. A redox flow battery charged and discharged by supply of a positive electrode electrolyte in a positive electrode tank and a negative electrode electrolyte in a negative electrode tank to a battery element including a positive electrode, a negative electrode, and a membrane interposed between these electrodes, said positive electrode electrolyte containing a manganese ion, a positive electrode charging pipe for supplying the positive electrode electrolyte to said battery element during charge and a positive electrode discharging pipe for supplying the positive electrode electrolyte to said battery element during discharge being connected to said positive electrode tank, said positive electrode charging pipe having one end opening to a position close to a liquid level of the positive electrode electrolyte in said positive electrode tank, said positive electrode discharging pipe having one end opening to a position close to the bottom of said positive electrode tank, a positive electrode charging return pipe for returning the positive electrode electrolyte from said battery element to said positive electrode tank during charge and a positive electrode discharging return pipe for returning the positive electrode electrolyte from said battery element to said positive electrode tank during discharge are connected to said positive electrode tank, said positive electrode charging return pipe has one end opening to a position close to the bottom of said positive electrode tank, said positive electrode discharging return pipe has one end opening to a position close to a liquid level of the positive electrode electrolyte in said positive electrode tank, each of said positive electrode charging return pipe and said positive electrode discharging return pipe has the other end connected to one end of a single positive electrode common return pipe, to deliver the positive electrode electrolyte from said battery element to said positive electrode charging return pipe and said positive electrode discharging return pipe via said positive electrode common return pipe, and said positive electrode common return pipe is provided with a three-way valve at a position where said positive electrode common return pipe is connected to said positive electrode charging return pipe and said positive electrode discharging return pipe.

2. The redox flow battery according to claim 1, wherein:
said negative electrode electrolyte containing a titanium ion, a negative electrode charging pipe for supplying the negative electrode electrolyte to said battery element during charge and a negative electrode discharging pipe for supplying the negative electrode electrolyte to said battery element during discharge being connected to said negative electrode tank, said negative electrode charging pipe having one end opening to a position close to the bottom of said negative electrode tank, said negative electrode discharging pipe having one end opening to a position close to a liquid level of the negative electrode electrolyte in said negative electrode tank.

3. The redox flow battery according to claim 1, wherein each of the charging pipe and the discharging pipe in the same electrode of one of positive and negative electrodes has the other end connected to one end of a single common pipe, to supply the electrolyte of this electrode to said battery element via said common pipe, said charging pipe and said discharging pipe connected to said common pipe are each provided with a pump for transferring said electrolyte by pressure, and said common pipe is provided with a three-way valve at a position where said common pipe is connected to said charging pipe and said discharging pipe.

4. The redox flow battery according to claim 1, wherein each of the charging pipe and the discharging pipe in the same electrode of one of positive and negative electrodes has the other end connected to one end of a single common pipe, to supply the electrolyte of this electrode to said battery element via said common pipe, and said charging pipe and said discharging pipe connected to said common pipe are each provided with a pump for transferring said electrolyte by pressure and a check valve.

5. The redox flow battery according to claim 1, wherein each of the charging pipe and the discharging pipe in the same electrode of one of positive and negative electrodes has the other end connected to one end of a single common pipe, to supply the electrolyte of this electrode to said battery element via said common pipe, and said common pipe is provided with a three-way valve at a position where said common pipe is connected to said charging pipe and said discharging pipe, and said common pipe is provided with a pump for transferring said electrolyte by pressure between said three-way valve and said battery element.

6. The redox flow battery according to claim 1, wherein said negative electrode electrolyte contains the manganese ion, said redox flow battery comprises a connection pipe connecting a liquid phase in said positive electrode tank to a liquid phase in said negative electrode tank, and said connection pipe has one end opening to a position close to a liquid level of the positive electrode electrolyte in said positive electrode tank.

7. The redox flow battery according to claim 1, wherein said positive electrode electrolyte further contains a titanium ion, said redox flow battery comprises a connection pipe connecting a liquid phase in said positive electrode tank to a liquid phase in said negative electrode tank, and said connection pipe has one end opening to a position close to the bottom of said negative electrode tank.

8. The redox flow battery according to claim 1, wherein said positive electrode electrolyte further contains a titanium ion, said negative electrode electrolyte contains the manganese ion and the titanium ion, said redox flow battery comprises a connection pipe connecting a liquid phase in said positive electrode tank to a liquid phase in said negative electrode tank, said connection pipe has one end opening to a position close to a liquid level of the positive electrode electrolyte in said positive electrode tank, and said connection pipe has the other end opening to a position close to the bottom of said negative electrode tank.

9. The redox flow battery according to claim 6, wherein said connection pipe is provided with an on/off valve.

10. The redox flow battery according to claim 6, wherein at least a portion of said connection pipe has an inner diameter $\phi$ of not more than 25 mm.

11. A redox flow battery charged and discharged by supply of a positive electrode electrolyte in a positive electrode tank and a negative electrode electrolyte in a negative electrode tank to a battery element including a positive electrode, a negative electrode, and a membrane interposed between these electrodes, said negative electrode electrolyte containing a titanium ion, a negative electrode charging pipe for supplying the negative electrode electrolyte to said battery element during charge and a negative electrode discharging pipe for supplying the negative electrode electrolyte to said battery element during discharge being connected to said negative electrode tank, said negative electrode charging pipe having one end opening to a position close to the bottom of said negative electrode tank, said negative electrode discharging pipe having one end opening to a position close to a liquid level of the negative electrode electrolyte in said negative electrode tank, a negative electrode charging return pipe for returning the negative electrode electrolyte from said battery element to said negative electrode tank during charge and a negative electrode discharging return pipe for returning the negative electrode electrolyte from said battery element to said negative electrode tank during discharge are connected to said negative electrode tank, said negative electrode charging return pipe has one end opening to a position close to a liquid level of the negative electrode electrolyte in said negative electrode tank, said negative electrode discharging return pipe has one end opening to a position close to the bottom of said negative electrode tank, each of said negative electrode charging return pipe and said negative electrode discharging return pipe has the other end connected to one end of a single negative electrode common return pipe, to deliver the negative electrode electrolyte from said battery element to said negative electrode charging return pipe and said negative electrode discharging return pipe via said negative electrode common return pipe, and said negative electrode common return pipe is provided with a three-way valve at a position where said negative electrode common return pipe is connected to said negative electrode charging return pipe and said negative electrode discharging return pipe.

12. A redox flow battery charged and discharged by supply of a positive electrode electrolyte in a positive electrode tank and a negative electrode electrolyte in a negative electrode tank to a battery element including a positive electrode, a negative electrode, and a membrane interposed between these electrodes, said redox flow battery including at least one of the positive electrode electrolyte containing a manganese ion as a positive electrode active material and the negative electrode electrolyte containing a titanium ion as a negative electrode active material, said redox flow battery comprising:

a stirring mechanism for stirring at least one of the positive electrode electrolyte containing the manganese ion stored in the positive electrode tank and the negative electrode electrolyte containing the titanium ion stored in the negative electrode tank, and a control mechanism for controlling operation of said stirring mechanism, said stirring mechanism includes:
    a stirring pipe having one end opening to a liquid phase in said tank, and the other end opening to the liquid phase or a gas phase in the same tank, and
    a liquid delivery pump for delivering the electrolyte from the side of said one end to the side of said other end.

13. The redox flow battery according to claim 12, wherein said stirring mechanism includes an introduction pipe connecting the inside and outside of said tank and opening to the electrolyte stored in the tank, and a gas supply mechanism for supplying inert gas into said tank via said introduction pipe.

14. The redox flow battery according to claim 12, wherein said stirring mechanism includes a stirring member for stirring the electrolyte in said tank by rotating or swinging in the electrolyte.

15. The redox flow battery according to claim 14, wherein said stirring member is operated by an electromagnetic force.

16. The redox flow battery according to claim 12, comprising a temperature regulation mechanism for regulating the temperature of the electrolyte provided in a portion of said stirring pipe.

17. The redox flow battery according to claim 12, comprising a filter for removing impurities and depositions in the electrolyte provided in a portion of said stirring pipe.

18. The redox flow battery according to claim 12, wherein said control mechanism causes said stirring mechanism to operate intermittently according to a predetermined schedule.

19. The redox flow battery according to claim 12, comprising a detection mechanism for detecting a state of distribution of active material ions in the electrolyte in said tank, wherein said control mechanism controls said stirring mechanism based on a detection result from said detection mechanism.

* * * * *